(12) United States Patent  (10) Patent No.: US 7,490,732 B2
Wasserman et al.  (45) Date of Patent: Feb. 17, 2009

(54) HANDLE

(75) Inventors: David M. Wasserman, Whitefish Bay, WI (US); John A. Wojcik, Sheboygan, WI (US); Mark V. LeGreve, Two Rivers, WI (US); Alan J. Schommer, Fredonia, WI (US); Paul J. Mulhauser, New York, NY (US); Karl D. Kirk, III, New York, NY (US)

(73) Assignee: The Vollrath Company, L.L.C., Sheboygan, WI (US)

( * ) Notice: Subject to any disclaimer, the term of this patent is extended or adjusted under 35 U.S.C. 154(b) by 120 days.

(21) Appl. No.: 11/389,565

(22) Filed: Mar. 24, 2006

(65) Prior Publication Data

US 2006/0213033 A1 Sep. 28, 2006

Related U.S. Application Data

(60) Provisional application No. 60/758,898, filed on Jan. 13, 2006, provisional application No. 60/665,183, filed on Mar. 25, 2005.

(51) Int. Cl.
*B65D 25/28* (2006.01)
(52) U.S. Cl. .................. 220/753; 220/752; 220/755; 16/431; 16/425
(58) Field of Classification Search ............... 16/431, 16/425; 220/753, 752, 770
See application file for complete search history.

(56) References Cited

U.S. PATENT DOCUMENTS

| 90,995 | A | * | 6/1869 | Clark | 220/753 |
| 216,346 | A | * | 6/1879 | Read | 220/771 |
| 413,640 | A | * | 10/1889 | Avery | 220/768 |
| D21,614 | S | * | 6/1892 | McLeod | D7/395 |
| 482,630 | A | * | 9/1892 | Fowler | 126/389.1 |
| 901,400 | A | * | 10/1908 | Vincent | 220/752 |
| 938,187 | A | * | 10/1909 | Walker | 294/34 |

(Continued)

FOREIGN PATENT DOCUMENTS

DE 597085 5/1934

(Continued)

OTHER PUBLICATIONS

All-Clad, Copper Core, 8"/9" Skillet/Pan, believed to be publicly available before Mar. 25, 2005.

(Continued)

*Primary Examiner*—Anthony D Stashick
*Assistant Examiner*—Christopher B McKinley
(74) *Attorney, Agent, or Firm*—Foley & Lardner LLP

(57) ABSTRACT

A handle is disclosed. The handle is for use with a utensil or tool such as a pan or other cookware. The handle comprises a core and may comprise a grip. The core comprises a base mounting portion coupled to the base and a grip portion including a first member and a second member spaced apart from the first member. Each of the first and second members include a vertical dimension greater than its horizontal dimensions. Bridge portions may extend between the first and second spaced apart members. The grip at least partially surrounds the grip mounting portion and may be overmolded to the core or slid on as a sleeve.

44 Claims, 25 Drawing Sheets

U.S. PATENT DOCUMENTS

| | | | |
|---|---|---|---|
| 1,067,231 A * | 7/1913 | Antoni | 76/101.1 |
| 1,282,552 A | 10/1918 | Duncan | |
| 1,317,715 A * | 10/1919 | Luttringhaus | 220/768 |
| 1,473,335 A * | 11/1923 | Chandler | 220/759 |
| 1,482,305 A | 1/1924 | Hodgson | |
| 1,618,675 A * | 2/1927 | Quigley | 220/573.1 |
| 1,645,381 A * | 10/1927 | Hastings | 220/753 |
| 1,712,675 A * | 5/1929 | Olsen | 220/753 |
| 1,728,619 A | 9/1929 | Lambert | |
| 1,730,820 A | 10/1929 | Holden | |
| 1,831,752 A * | 11/1931 | Reinold | 220/752 |
| 1,837,109 A | 12/1931 | Burvenick | |
| 1,942,493 A * | 1/1934 | Reith | 16/431 |
| 1,965,354 A * | 7/1934 | Patock | 16/421 |
| 1,976,411 A * | 10/1934 | Olson | 220/753 |
| 2,133,252 A * | 10/1938 | Moore et al. | 16/430 |
| 2,140,157 A | 12/1938 | Huffman | |
| 2,144,474 A | 1/1939 | Woodman | |
| 2,231,222 A * | 2/1941 | Rosenheimer, Jr. | 220/755 |
| 2,246,393 A * | 6/1941 | Sperry | 220/752 |
| 2,254,571 A | 9/1941 | Hailey | |
| 2,362,720 A * | 11/1944 | Reichart | 294/31.1 |
| D140,046 S * | 1/1945 | Behl | D7/394 |
| 2,473,964 A * | 6/1949 | Moore | 220/769 |
| 2,501,940 A * | 3/1950 | Hibbard | 16/425 |
| 2,511,786 A | 6/1950 | Patti | |
| 2,520,808 A | 8/1950 | Miller | |
| 2,619,672 A * | 12/1952 | Glaser et al. | 16/421 |
| 2,624,066 A * | 1/1953 | Fry | 220/768 |
| 2,635,280 A * | 4/1953 | Baca | 16/431 |
| 2,722,173 A * | 11/1955 | Dorr | 249/168 |
| 2,815,527 A * | 12/1957 | Hollaway, Jr. et al. | 220/753 |
| 2,965,405 A | 12/1960 | Herrick | |
| 2,981,484 A * | 4/1961 | Hirsch | 239/530 |
| 3,661,296 A * | 5/1972 | Hamer | 220/755 |
| 4,197,611 A * | 4/1980 | Bell et al. | 220/753 |
| 4,209,877 A * | 7/1980 | Colasent | 220/753 |
| D258,861 S | 4/1981 | Bratton et al. | |
| D266,895 S | 11/1982 | Hellinger et al. | |
| D266,896 S | 11/1982 | Hellinger et al. | |
| 4,413,767 A * | 11/1983 | Hellinger | 228/136 |
| 4,491,235 A * | 1/1985 | Fournier et al. | 220/753 |
| D283,188 S | 4/1986 | Pool | |
| 4,653,468 A * | 3/1987 | Lemme et al. | 126/373.1 |
| 4,768,427 A | 9/1988 | Cheng | |
| 4,781,302 A * | 11/1988 | Pearson | 220/752 |
| 5,121,848 A * | 6/1992 | Waligorski | 220/775 |
| 5,447,351 A | 9/1995 | Klunder | |
| D366,181 S | 1/1996 | Rossiaud | |
| D377,438 S | 1/1997 | Brunianyn | |
| D377,883 S | 2/1997 | Candianides | |
| D392,151 S | 3/1998 | Munari | |
| D393,776 S | 4/1998 | Kessler | |
| 5,802,960 A * | 9/1998 | Graj et al. | 99/403 |
| 5,867,867 A * | 2/1999 | Kessler | 16/425 |
| D415,928 S | 11/1999 | Kaposi et al. | |
| D417,121 S * | 11/1999 | Brunianyn | D7/395 |
| 6,032,822 A | 3/2000 | Munari | |
| 6,158,089 A * | 12/2000 | Monahan et al. | 16/429 |
| D436,813 S | 1/2001 | Kobayashi et al. | |
| 6,170,694 B1 | 1/2001 | Munari | |
| D438,054 S | 2/2001 | Munari | |
| D442,428 S | 5/2001 | Munari | |
| D447,383 S | 9/2001 | Rae | |
| D448,607 S * | 10/2001 | Munari | D7/393 |
| D448,973 S | 10/2001 | Hay et al. | |
| 6,419,107 B1 * | 7/2002 | Cheng | 220/573.1 |
| D461,363 S * | 8/2002 | Law | D7/395 |
| D463,714 S | 10/2002 | Munari | |
| D470,716 S | 2/2003 | Kloppsteck | |
| D480,912 S * | 10/2003 | Logiudice et al. | D7/395 |
| D483,990 S | 12/2003 | Munari | |
| 6,712,412 B2 * | 3/2004 | Kahler et al. | 294/30 |
| 6,725,505 B2 * | 4/2004 | Willat | 16/430 |
| D491,764 S | 6/2004 | Munari | |
| D494,412 S * | 8/2004 | Prakasa | D7/395 |
| D496,219 S * | 9/2004 | Rae | D7/395 |
| D497,767 S | 11/2004 | Cacace | |
| D501,357 S * | 2/2005 | Rae | D7/395 |
| D501,358 S * | 2/2005 | LoGiudice et al. | D7/395 |
| 6,848,355 B2 * | 2/2005 | Cesare | 99/342 |
| D503,585 S * | 4/2005 | Tetreault et al. | D7/395 |
| D508,631 S * | 8/2005 | Cuillery | D7/395 |
| D512,266 S | 12/2005 | Munari | |
| D518,331 S | 4/2006 | Rae | |
| D520,296 S | 5/2006 | Brownwell | |
| D525,827 S * | 8/2006 | Munari | D7/393 |
| D527,580 S * | 9/2006 | Munari | D7/395 |
| D533,026 S | 12/2006 | Dotterman et al. | |
| 2004/0060936 A1 * | 4/2004 | Logiudice | 220/254.1 |
| 2006/0213033 A1 | 9/2006 | Wasserman et al. | |
| 2006/0237470 A1 | 10/2006 | Zanner et al. | |

FOREIGN PATENT DOCUMENTS

| | | |
|---|---|---|
| DE | 295 11 144 | 9/1995 |
| EP | 1 051 943 B1 | 11/2000 |
| FR | 607.077 | 6/1926 |
| FR | 607077 | 6/1926 |
| GB | 141155 | 4/1920 |
| IT | 246298 | 3/1928 |

OTHER PUBLICATIONS

All-Clad, Masterchef II, 8"/9" Skillet/Pan, believed to be publicly available before Mar. 25, 2005.

All-Clad, 8"/9" Skillet/Pan, believed to be publicly available before Mar. 25, 2005.

Analon Advanced, 8"/9" Skillet/Pan, believed to be publicly available before Mar. 25, 2005.

Calphalon One, 8"/9" Skillet/Pan, believed to be publicly available before Mar. 25, 2005.

Calphalon, 8"/9" Skillet/Pan, believed to be publicly available before Mar. 25, 2005.

Calphalon Simply 8"/9" Skillet/Pan, believed to be publicly available before Mar. 25, 2005.

Calphalon Contemporary 8"/9" Skillet/Pan, believed to be publicly available before Mar. 25, 2005.

Circulon Premier, 8"/9" Skillet/Pan, believed to be publicly available before Mar. 25, 2005.

Circulon, 8"/9" Skillet/Pan, believed to be publicly available before Mar. 25, 2005.

Farberware Millennium Soft Touch, 8"/9" Skillet/Pan, believed to be publicly available before Mar. 25, 2005.

European Search Report for EP 06 00 6087, date of mailing May 19, 2006, 3 pages.

European Search Report for EP 06 00 6087, date of mailing May 19, 2006, 1 page.

European Patent Office (EPO), Communication Under Rule 71(3) for related application No. 06 006 087.8-2313 (6 pages) with application text amended by EPO and pending claims (47 pages).

EPO, Guidelines for Examination in the EPO, 2.5 Communication under Rule 71(3), printed from http://www.epo.org/patents/law/legal-tests/html/guiex/e/c_vi_2_5.htm on Mar. 13, 2008 (1 page).

EPO, Rule 71—Examination procedure, printed from http://www.epo.org/patents/law/legal-texts/html/epc/2000/e/r71.html?popup=yes on Mar. 13, 2008 (2 pages).

International Search Report and Written Opinion for Application No. PCT/US2008/051995, mailing date May 21, 2008, 11 pages.

* cited by examiner

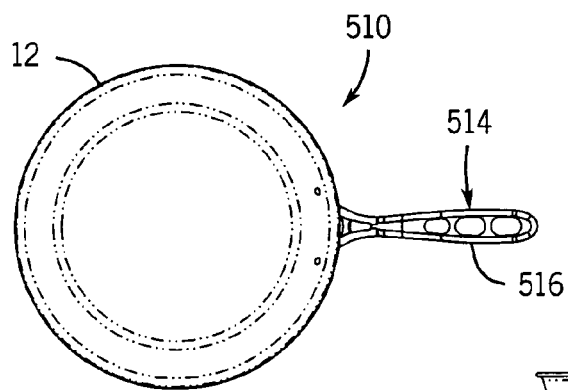
FIG. 8A
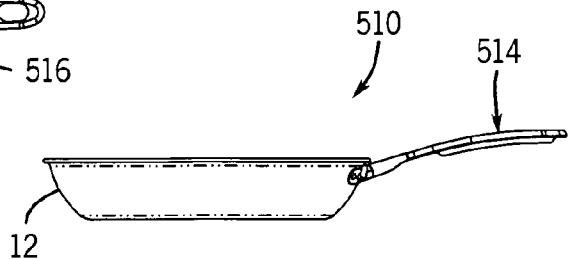
FIG. 8B
FIG. 8C
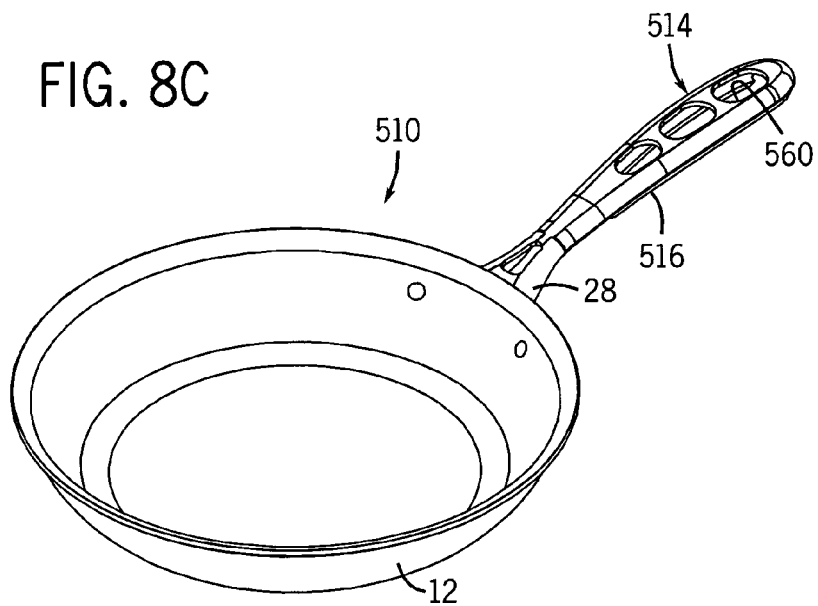
FIG. 8D
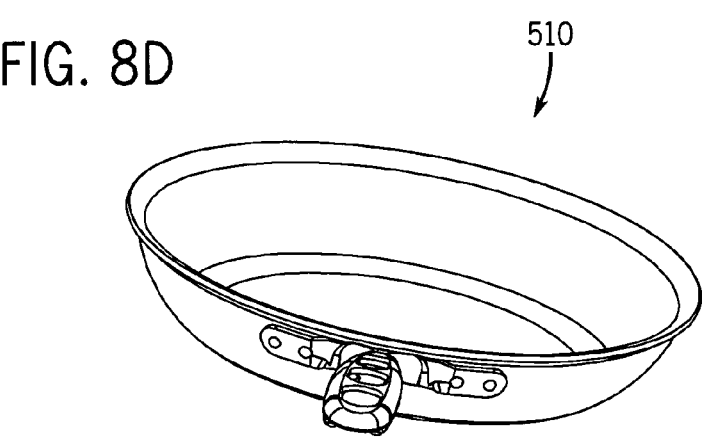

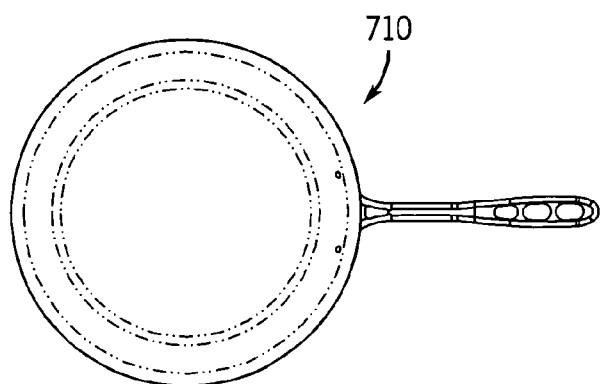
FIG. 10A
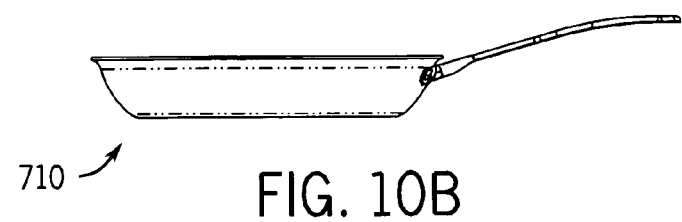
FIG. 10B
FIG. 10C
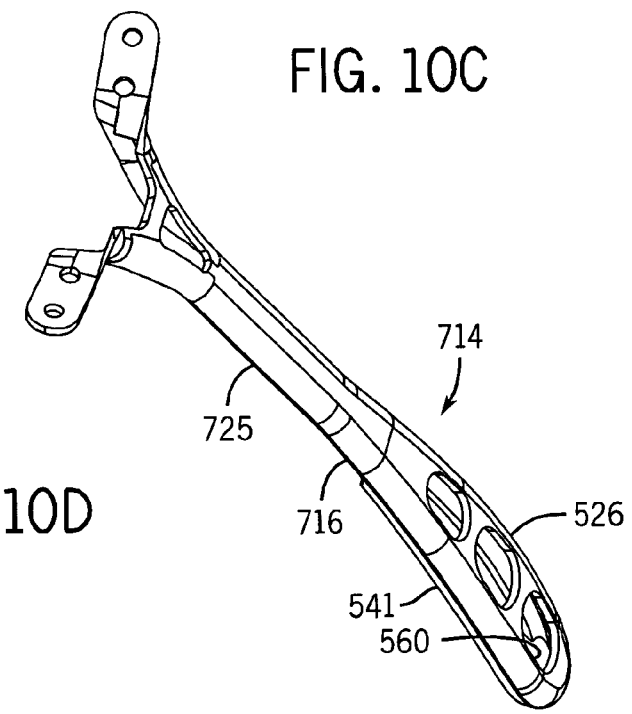
FIG. 10D
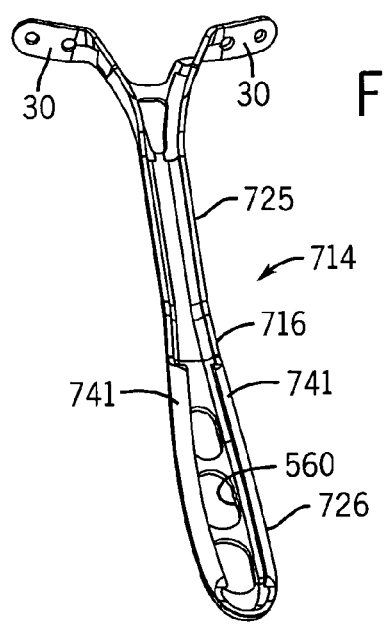

HANDLE

CROSS-REFERENCE TO RELATED PATENT APPLICATIONS

The present application claims priority under 35 U.S.C. § 119 from U.S. Provisional Patent Application No. 60/665,183 titled "HANDLE" filed Mar. 25, 2005, the full disclosure of which is hereby incorporated herein by reference, and U.S. Provisional Patent Application No. 60/758,898 titled "HANDLE" filed Jan. 13, 2006, the full disclosure of which is hereby incorporated herein by reference.

The following U.S. patent applications are cited by reference and hereby incorporated herein by reference: (a) U.S. patent application Ser. No. 29/254,029 filed on Feb. 16, 2006 and titled "PAN"; (b) U.S. patent application Ser. No. 29/254,030 filed on Feb. 16, 2006 and titled "PAN"; (c) U.S. patent application Ser. No. 29/254,039 filed on Feb. 16, 2006 and titled "PAN"; (d) U.S. patent application Ser. No. 29/254,073 filed on Feb. 16, 2006 and titled "PAN".

BACKGROUND

The present invention relates to a handle for a utensil or tool such as a pan. More particularly, the present invention relates to a handle with a structure configured to facilitate manual lifting and movement by the user's hand.

It is generally known to provide a handle for a utensil or tool such as a pan. Such known handles typically include a single thick metal shaft or bar and may include a grip that has been compression molded to the shaft.

However, such known handles have several disadvantages. For example, known handles typically include a non-contoured grip configuration and substantial heat conductivity due to the thick metal shaft or bar, which tend to make such known handles uncomfortable to use (e.g., fatigue and heat felt by the hand of the user) as well as expensive to manufacture (e.g., materials and labor costs).

Accordingly, it would be advantageous to provide a handle for a utensil or tool such as a pan that has a structure configured to facilitate manual lifting and movement by the user's hand. It would also be advantageous to provide a contoured and ergonomic handle that is better balanced and more comfortable during use. It would further be advantageous to provide a handle that requires less material to manufacture and yet still provides comparable rigidity to known handles. It would further be advantageous to provide a handle that dissipates heat effectively and efficiently. It would be desirable to provide for a handle having one or more of these or other advantageous features. To provide an inexpensive, reliable, and widely adaptable handle that avoids the above-referenced and other problems would represent a significant advance in the art.

SUMMARY

The present invention relates to an apparatus comprising a base and a handle. The handle comprises a core and a grip. The core comprises a base mounting portion coupled to the base and a grip mounting portion including a first member and a second member spaced apart from the first member. Each of the first and second members include a vertical dimension greater than its horizontal dimensions. The grip at least partially surrounds the grip mounting portion. The "base" may be in the form of a utensil or tool such as a pan or other cookware or instrument.

The present invention also relates to an apparatus comprising a receptacle and a handle. The handle comprises a core and a grip. The core comprises a bifurcated head portion coupled to the receptacle, and an insert portion coupled to the head portion. The insert portion comprises a first vertical girder extending in a direction away from the receptacle and second vertical girder extending in a direction away from the receptacle and spaced from the first girder. The grip at least partially surrounds the insert portion.

The present invention further relates to an apparatus comprising a receptacle and a handle. The handle comprises a mounting portion coupled to the receptacle and a grip portion coupled to the mounting portion. The grip portion comprises a first member, a second member, and a bridge extending between the first member and the second member. Each of the first member and the second member comprises a vertical dimension greater than its horizontal dimension.

The present invention further relates to various features and combinations of features shown and described in the disclosed embodiments. Other ways in which the objects and features of the disclosed embodiments are accomplished will be described in the following specification or will become apparent to those skilled in the art after they have read this specification. Such other ways are deemed to fall within the scope of the disclosed embodiments if they fall within the scope of the claims which follow.

BRIEF DESCRIPTION OF THE DRAWINGS

FIGS. 8A and 8B are top and side views of a pan with a handle according to an exemplary embodiment.

FIGS. 8C, 8D, and 8E are a top perspective view, end view and bottom perspective view of the pan of FIG. 8A.

FIGS. 10A and 10B are top and side views of a pan with a handle according to an exemplary embodiment.

FIGS. 10C, 10D, 10E, 10F, 10G, 10H, 10I, and 10J are perspective, top, side, and end views of a core for the handle as shown in FIG. 10A according to exemplary embodiments.

DETAILED DESCRIPTION OF THE PREFERRED AND EXEMPLARY EMBODIMENTS

Figure 1:
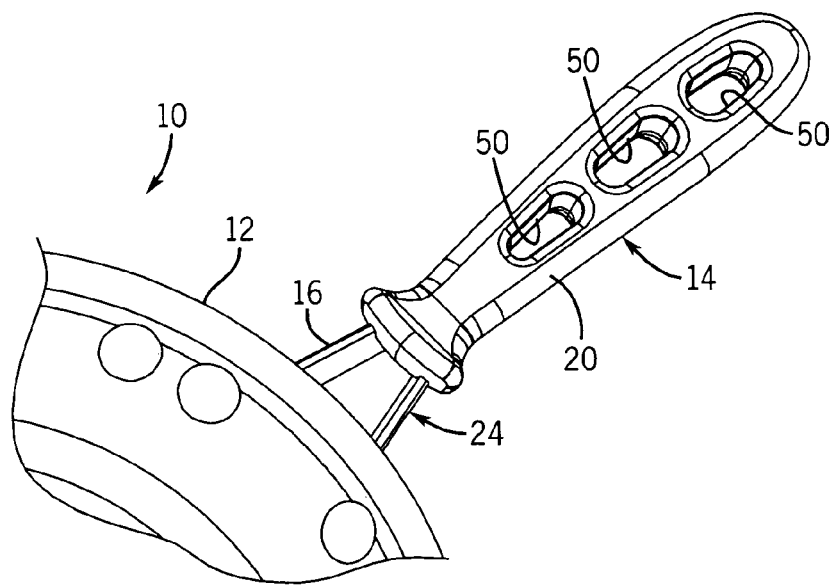
FIG. 1 is a top fragmentary perspective view of a pan with a handle according to an exemplary embodiment.

Before explaining a number preferred, exemplary, and alternative embodiments of the invention in detail it is to be understood that the invention is not limited to the details of construction and the arrangement of the components set forth in the following description or illustrated in the drawings. The invention is capable of other embodiments or being practiced or carried out in various ways. It is also to be understood that the phraseology and terminology employed herein is for the purpose of description and should not be regarded as limiting.

FIG. 1 is fragmentary perspective view of a utensil or tool (shown as pan 10). Pan 10 generally includes a base or working end (shown as a receptacle 12) and a handle 14. Receptacle 12 generally comprises a structure configured to support or contain fluids, particulates or other materials. In the particular embodiment illustrated, receptacle 12 comprises a basin configured to contain food. In the particular embodiment illustrated, receptacle 12 comprises a basin formed from a material having a high level of thermal conductivity and the ability to withstand high heat such that food or other material contained within receptacle 12 may be heated. In one embodiment, receptacle 12 may be formed from aluminum. In another embodiment, receptacle 12 may be formed from steel or iron. In particular embodiments, receptacle 12 may have an interior surface coated with a low friction material such as polytetraflourethylene or other materials. In other embodiments, receptacle 12 may have other configurations besides a basin. For example, in other embodiments, receptacle 12 may be configured to support food or other material, such as a sheet, which is formed from one or more layers of material having a high level of thermal conductivity and the ability to withstand high temperatures without degradation, such as aluminum or steel.

Figure 2:
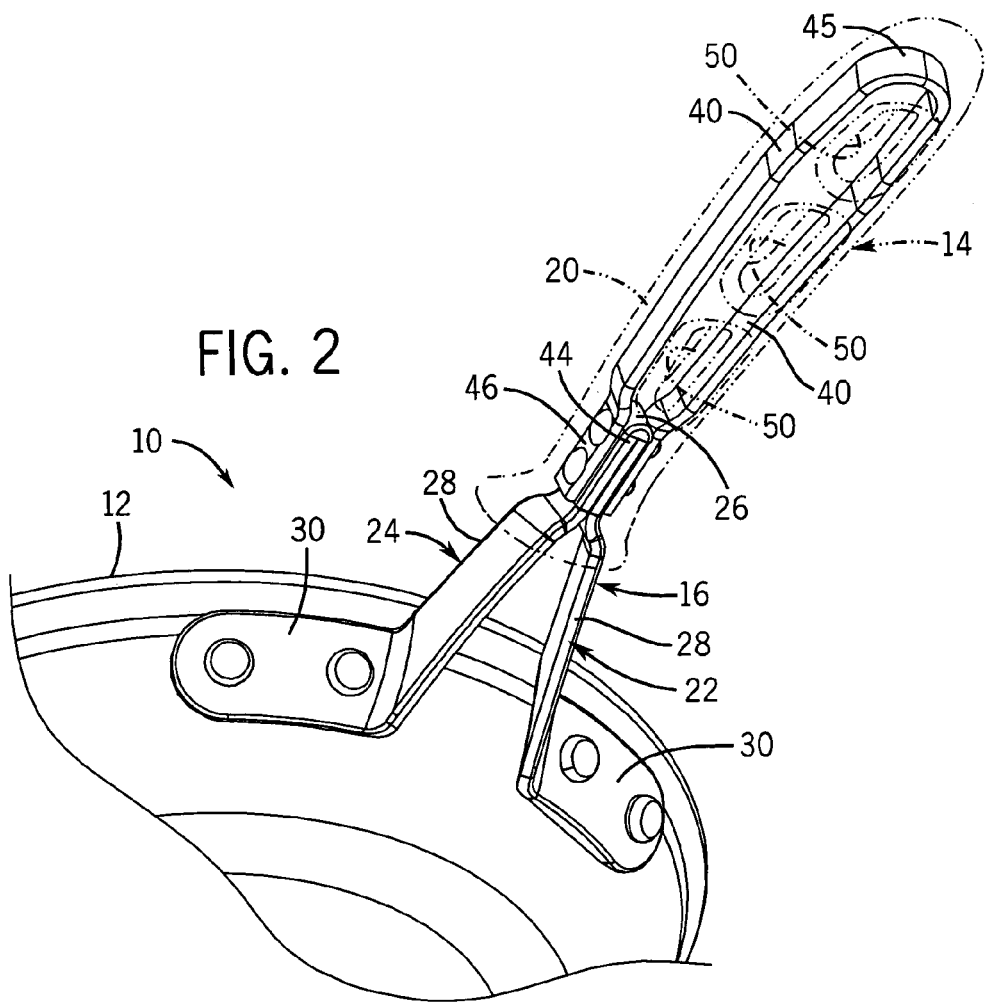
FIG. 2 is a bottom perspective view of the pan and handle of FIG. 1.

Handle 14 comprises a structure configured to facilitate manual lifting and movement of receptacle 12 by a person's hand. Handle 14 generally includes core 16 and grip 20 (e.g., user interface). According to a preferred embodiment, handle 14 uses less metal (e.g., cross-sectional area) in contact with the receptacle 12 and for structural support of the handle so that less heat is conducted from the receptacle through the handle and to the hand of the user (i.e., the reduced material mass acts as a restrictor to reduce or minimize heat flow). FIG. 2 uses broken lines to illustrate portions of handle 14 as being transparent for purposes of illustration. Core 16 serves as a rigid backbone or structure for handle 14. Core 16 extends within handle 14 and terminates in this exemplary embodiment, at a bifurcated end 22 (e.g., yoke) which is coupled to receptacle 12. Core 16 generally includes a base mounting portion (shown as head portion 24) and a grip mounting portion (shown as insert portion 26). Head portion 24 comprises that portion of core 16 substantially projecting from grip 20 and connected to receptacle 12. Head portion 24 includes a pair of support beams 28 (e.g., members, bars, rod, shaft, cantilever, etc.) and pair of connection flanges 30. Beams 28 generally comprise vertical beams in that beams 28 have an upwardly facing dimension (e.g., thickness, length, width, etc.) which is substantially less than horizontally facing side dimension (e.g., thickness, length, width, etc.) of such beams 24. As a result, beams 28 provide structurally rigidity and strength for supporting vertical loading of receptacle 12 caused by the contents of receptacle 12. Further, the configuration of the beams and flanges are intended to provide a thinner aspect ration to reduce or minimize the heat flow into the handle. Beams 28 further serve to space handle 14 and grip 20 in particular, from receptacle 12. In the particular embodiment shown, beams 28 space handle 14 from receptacle 12 by a distance along the axis of handle 14 of at least one inch. In other embodiments, such spacing may be larger or smaller. Because beams 28 space handle 14 from receptacle 12, less heat is transferred to handle 14. Because beams 28 are spaced from one another and are separated by an opening therebetween, any heat that may be conducting through beams 28 may dissipate prior to reaching handle 14 and grip 20. Moreover, because beams 28 diverge from one another, beams 28 are connected to receptacle 12 at wider spacings, providing greater stability.

Mounting flanges 30 project from beams 28 and are provided for mounting head portion 24 and handle 14 to receptacle 12. In the particular embodiment shown, mounting flanges 30 are shaped to as closely conform to the exterior surface of receptacle 12 along sidewalls of receptacle 12. Mounting flanges 30 are fastened to receptacle 12. In the particular embodiment illustrated, mounting flanges 30 are fastened to receptacle 12 by four rivets. In other embodiments, mounting flanges 30 may be fastened or secured to receptacle 12 by other fasteners or may be secured to receptacle 12 by welding, bonding and any of a variety of other securement techniques.

Insert portion 26 of core 16 generally serves as a main skeleton for handle 14, and grip 20 in particular. Insert portion 26 extends from head portion 24 and includes a pair of opposing spaced-apart members (e.g., bars, beams, members, rods, shafts, cantilevers, etc. and will be generally referred to as girders 40). "Beams" and "girders" generally refer to structural members with one lateral dimension larger than the other lateral dimension. The dimensional configuration of the beams and girders are configured to provide increased structural rigidity (e.g., moment of inertia) with the minimal amount of material mass providing the desired structural properties. Girders 40 generally extend along opposite sides of handle 14 within grip 20. In the embodiment shown in FIGS. 1 and 2, girders 40 generally comprise vertical beams or generally vertical oriented structures having a generally upwardly facing dimension (e.g., thickness, length, width, etc.) which is substantially less than the sideways or horizontally facing dimension (e.g., thickness, length, width, etc.) of such beams. As a result, girders 40 provide substantial rigidity, stiffness and strength to handle 14 with reduced material use. Because girders 40 use less material, handle 14 is less expensive. Moreover, because girders 40 use less material, less heat from receptacle 12 is transferred (e.g., conducted, radiated, etc.) through girders 40 and through handle 14. In addition, a greater portion of handle 14 may be provided by grip 20 which may be formed of material that may be more easily shaped and configured for ergonomic gripping and that may be formed of a material (e.g., thermoplastic, thermoset, elastomer, etc.) that is less thermally conductive as compared to the rigid material (e.g., metal such as steel, iron, aluminum, etc.) that may be used to form girders 40 of insert portion 26.

In the particular example shown in FIG. 2, head portion 24 and insert portion 26 are each integrally formed as distinct unitary bodies which are fastened, welded, bonded or otherwise adhered to one another. In the particular example shown, head portion 24 comprises an elongate band of metal having an intermediate neck portion 44 crimped or bent so as to extend parallel to one another, to include diverging portions which form beams 28, and to extend outwardly at its terminal ends to form mounting flanges 30. Insert portion 26 comprises a single continuous elongate band of metallic material that is bent, deformed or cast to extend in a loop so as to form girders 40. Terminal ends 46 of loop 45 are fastened, mounted or otherwise secured to portion 44. In the embodiment shown, ends 46 are fastened (e.g., by rivets, other fasteners, welding, bonding, or other securement techniques) to and through portion 44. Because head portion 24 and insert portion 26 are each integrally formed as single unitary bodies, core 16 of handle 14 is stronger and is less expensive to fabricate. In other embodiments, head portion 24 and insert portion 26 may be integrally formed as a single unitary body or may be formed from a greater number of individual parts.

Grip 20 generally comprises a mass of material at least partially surrounding insert portion 26 of core 16. According to one exemplary embodiment, grip 20 is formed from a material having a lower thermal conductivity as compared to material or materials of insert portion 26 and/or head portion 24 and is intended to insulate the hand from heat in the insert portion 26. According to one exemplary embodiment, grip 20 may be formed from a polymeric material that is overmolded about insert portion 26 as well as the junction of insert portion 26 and head portion 24. In other embodiments, grip 20 may be formed from other materials and may be secured about insert portion 26 of core 16 in other fashions. For example, in other embodiments, grip 20 may be comprised of two halves or a clamshell which are wrapped about insert portion 26. In another embodiment, grip 20 may be a unitary or integral, one-piece part that includes a cavity that receives insert portion 26 and is pushed on to insert portion 26.

As shown in the FIGURES, the grip generally has an elongated body and may include an enlarged (e.g., bulbous, etc.) end or head portion (e.g., to provide a gripping reference point for the user's hand, prevent the hand from slipping towards the receptacle 12, shield the hand from heat radiating from the head portion, the receptacle, or the heat source, etc.). As further shown by FIGS. 1 and 2, grip 20 includes multiple apertures 50 axially spaced along handle 14. Apertures 50 pass through grip 20 and pass through and between girders 40 of insert portion 26. Apertures 50 further facilitate dissipation of heat that may be conducting through girders 40 from receptacle 12. As a result, handle 14 and grip 20 in particular, may be more easily and comfortably grasped while receptacle 12 is being exposed to high temperatures. Referring to FIG. 3A, the surface of the grip within the apertures (interior) are generally not (and are not intended to be) in contact with the hand of the user. As shown in FIG. 3A, grip 20 has an inner lateral surface 21 and an outer lateral surface 23 and girders 40 have an inner lateral surface 41 and an outer lateral surface 43. According to an exemplary embodiment shown in FIG. 3A, the wall thickness of the material between the girders and the surface of the grip within the apertures is less than the wall thickness of the material between the girders and the surface of the grip intended to come in contact with the hand of the user. As such, heat is intended to dissipate through the surface of the grip within the apertures (i.e., where the user's hand will not be in direct contact).

Figure 3:
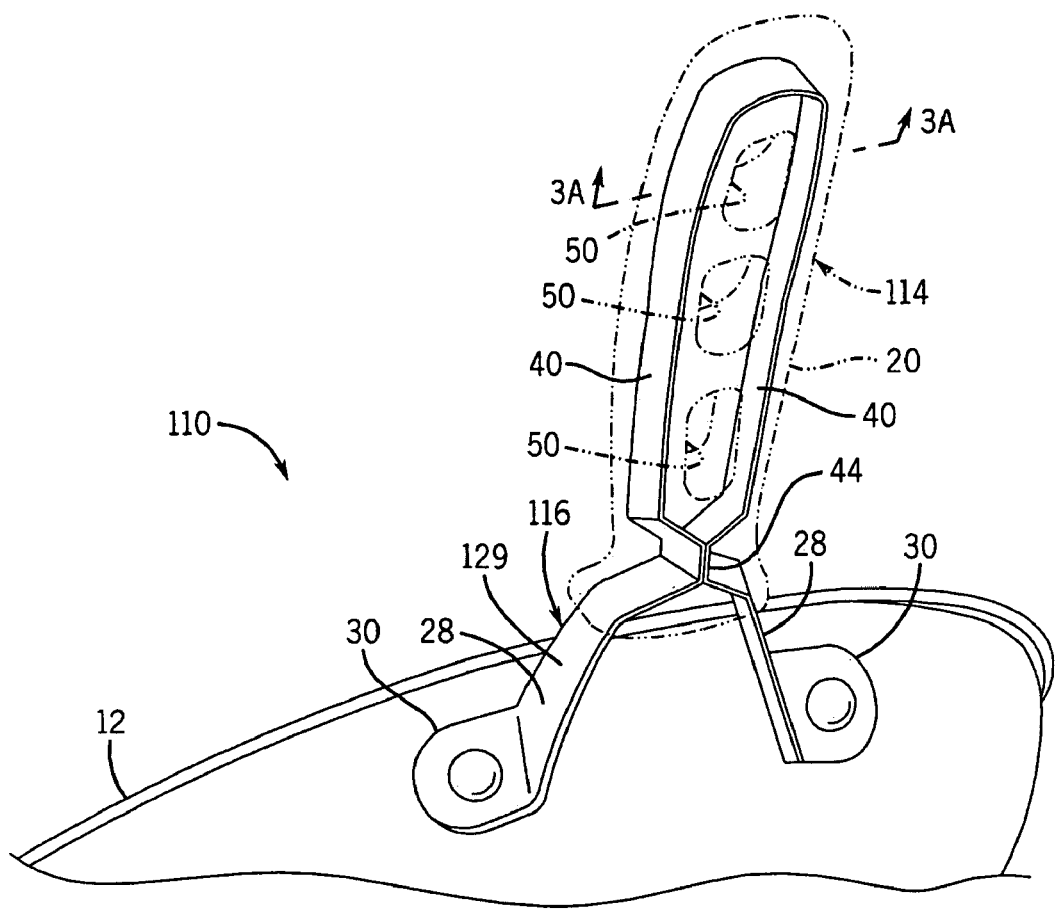
FIG. 3 is a handle coupled to a pan according to an exemplary embodiment.
Figure 3A:
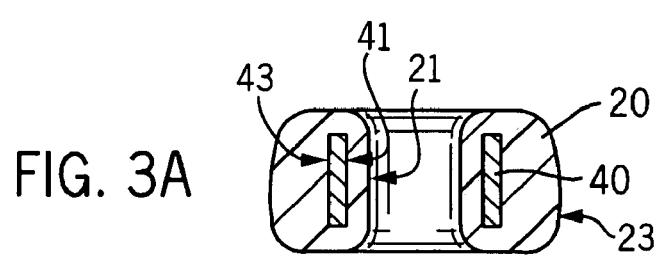
FIG. 3A is a section view of a handle grip and support structure taken through an aperture in the handle along line 3A-3A in FIG. 3.

FIG. 3 is a fragmentary perspective view of pan 110, another embodiment of pan 10 shown in FIGS. 1 and 2. Pan 110 is similar to pan 10 except that pan 110 includes handle 114 in lieu of handle 14. Handle 114 is similar to handle 14 except that handle 114 includes core 116 in lieu of core 16. Core 116 is itself similar to core 16 except that head portion 24 and insert portion 26 of core 116 are integrally formed as a single unitary or one-piece body. In particular, head portion 24 and insert portion 26 are formed from a single elongate vertical beam 129 which is bent, cast or otherwise formed so as to provide beams 28, mounting flanges 30, neck 44 and girders 40. Like beams 28 and girders 40 of handle 14, beams 28 and girders 40 of handle 114 comprise generally vertical beams having upwardly dimension (e.g., thickness, length, width, etc.) less than the horizontal or sidewards facing dimension (e.g., thickness, length, width, etc.). As a result, beams 28 and girders 40 provide a rigid skeleton or core or handle 114 for supporting loading of receptacle 12 with less material. The less material reduces thermal conduction to handle 114. In addition, the less material enables openings 50 to be formed between girders 40 for enhanced thermal dissipation from handle 114. The strength of beams 28 further enables core 116 to be bifurcated, providing a wider connection base to receptacle 12 for improved stability, separating grip 20 from receptacle 12 and facilitating heat dissipation from beams 28. Because head portion 24 and insert portion 26 are integrally formed as part of a single unitary body from a single member (e.g., beam, strip, plate, sheet, etc.) of a relatively rigid material, such as a metal, manufacturing costs are reduced.

Figures 4A, 4B, 4C:
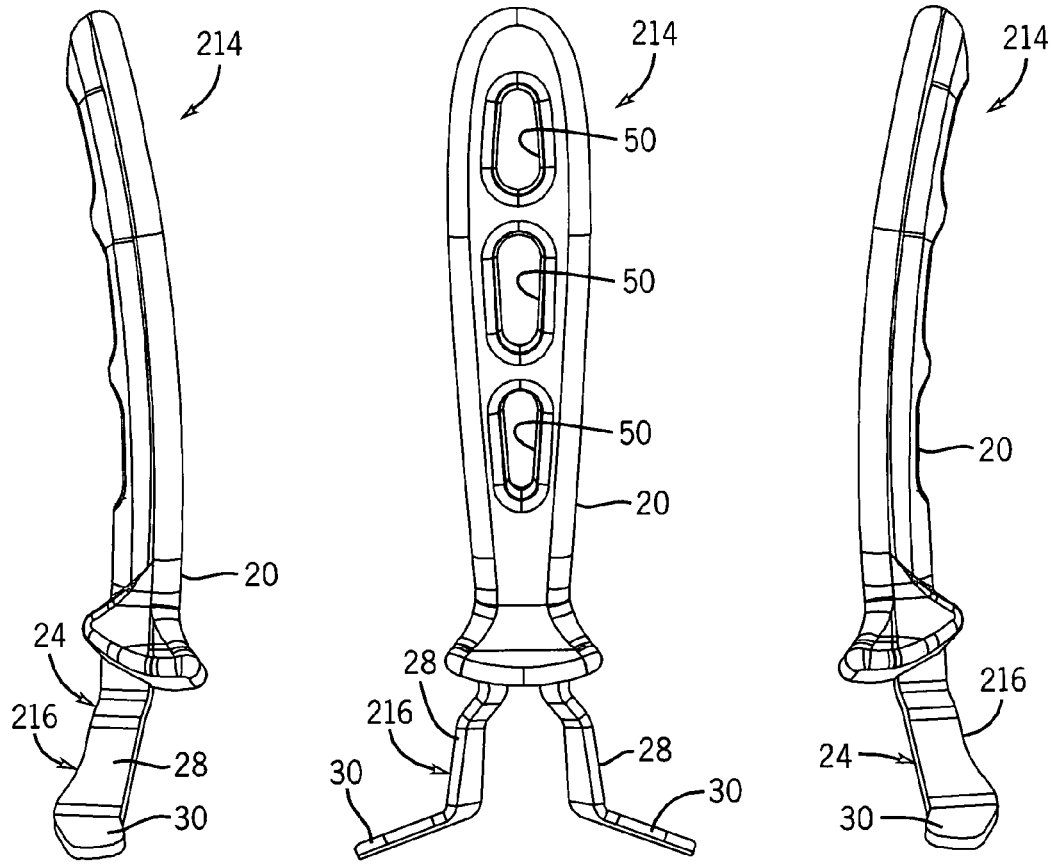
FIGS. 4A, 4B, 4C, 4D are side, top, and end views of the handle of FIG. 1.
Figure 4D:
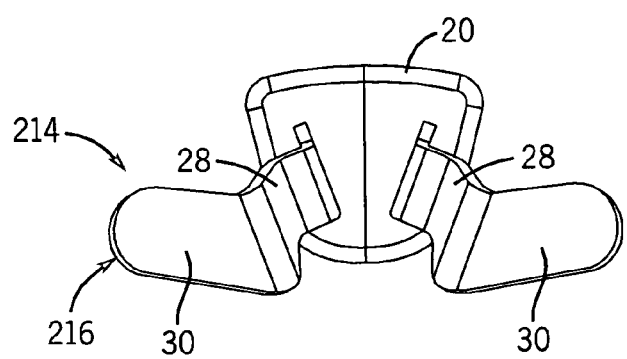
Figure 4E:
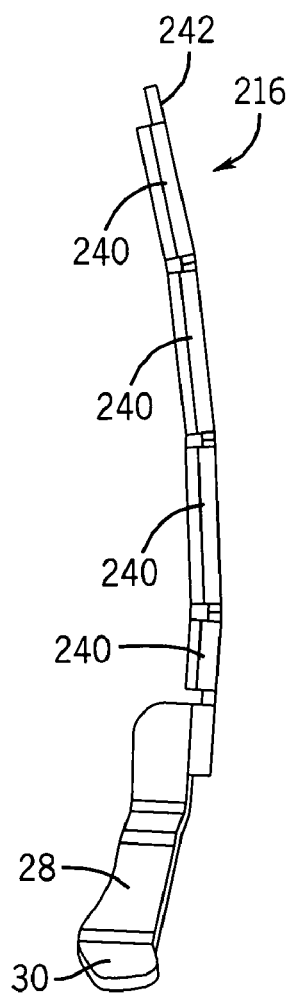
FIGS. 4E, 4F, and 4G are side, top, and end views of a core for the handle shown in FIGS. 4A-4D.
Figure 4F:
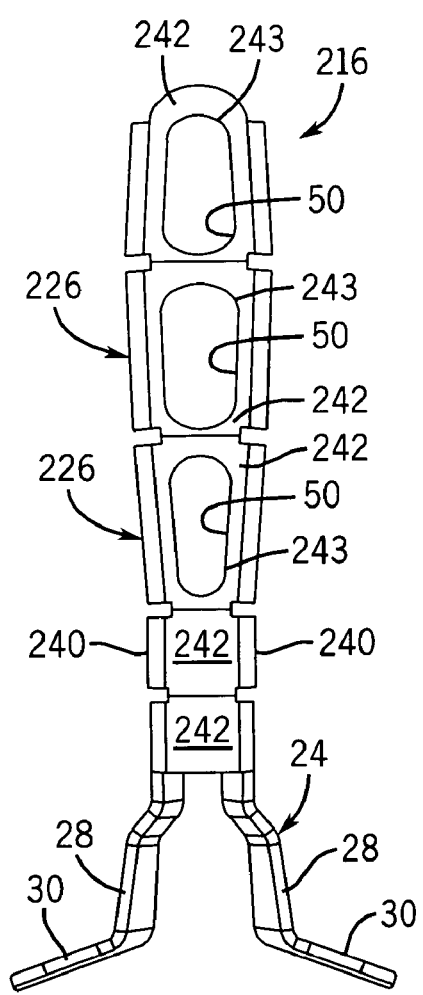
Figure 4G:
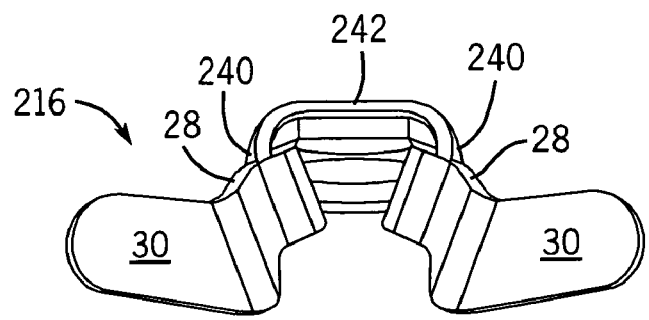

FIGS. 4A-4D illustrate handle 214, another embodiment of handle 14. FIGS. 4E-4G illustrate core 216 of handle 214. Handle 214 is similar to handle 114 (shown in FIG. 3) except that handle 214 includes core 216. Core 216 is similar to core 116 except that core 216 had an insert portion 226 including girders 240 and members (e.g., cross, span, intermediate, etc. and generally shown as bridge portions 242). Girders 240 are similar to girders 40 except that girders 240 do not continuously extend along opposite lateral sides of handle 214. Rather, girders 240 comprise elongate vertical beam segments extending along a longitudinal axis of handle 214 and of core 216. Such girders 240 are interconnected to one another by bridge portions 242. Because girders 240 are broken into distinct segments, bending, deformation or forming of core 216 into complex curves and shapes is facilitated. At the same time, girder 242, like girders 20, comprise generally vertical beams providing handle 214 with enhance rigidity and strength using less material.

Bridge portions 242 comprise structures bridging (e.g., spanning, extending, connecting, etc.) between opposite girder segments 240. In the particular example shown, bridge portions 242 comprise relatively thin horizontal panels of a rigid material such as metal. In the particular example shown, bridge portions 242 are integrally formed as part of a single unitary or one-piece body with remaining bridge portions 242 and girders 240. In the particular example shown, the entirety of core 216 is integrally formed as part of a single unitary body from metal. In one embodiment, core 216 is formed from a stamped and deformed sheet of metal. As a result, manufacturing costs are lessened.

As further shown by FIG. 4F, bridge portions 242 include openings 243 that serve to form apertures 50 through handle 214. Such openings 243 facilitate dissipation of heat from bridge portions 242 and from core 216. Such openings 243 further lessen a weight of handle 214.

Figure 5A:
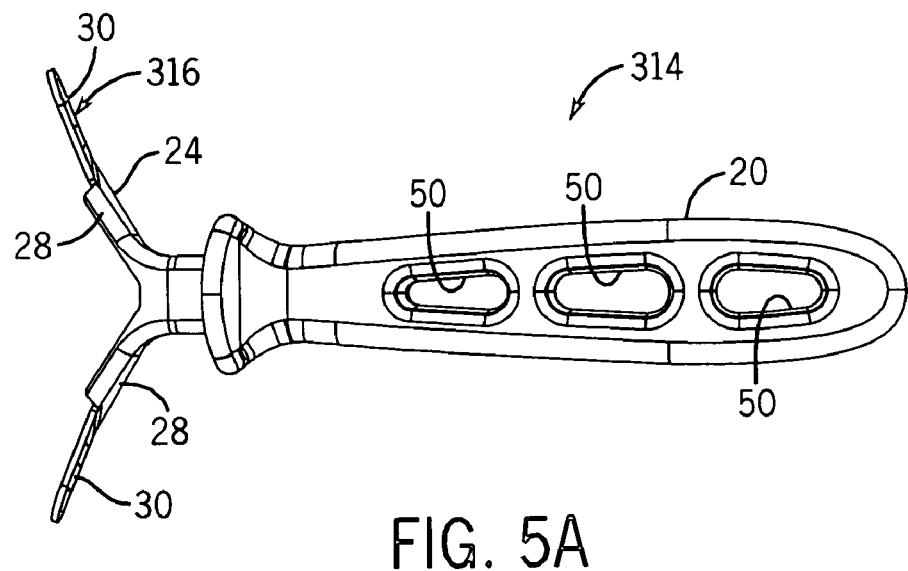
FIGS. 5A and 5B are top and side views of a handle according to an exemplary embodiment.
Figure 5B:
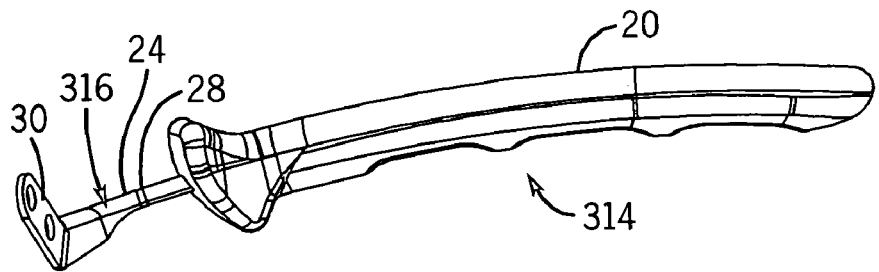
Figure 5C:
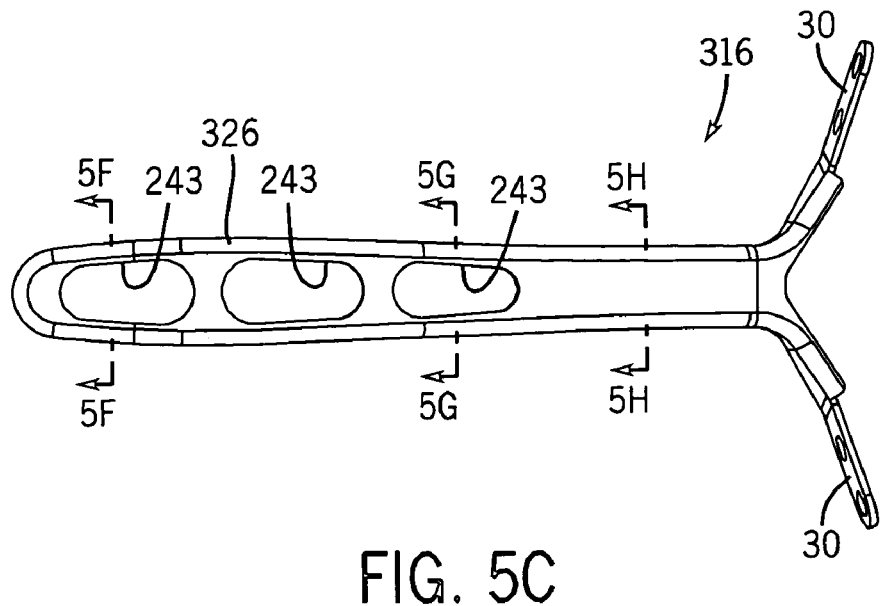
FIGS. 5C, 5D, and 5E are top, side, and end views of a core for the handle shown in FIGS. 5A and 5B.
Figure 5D:
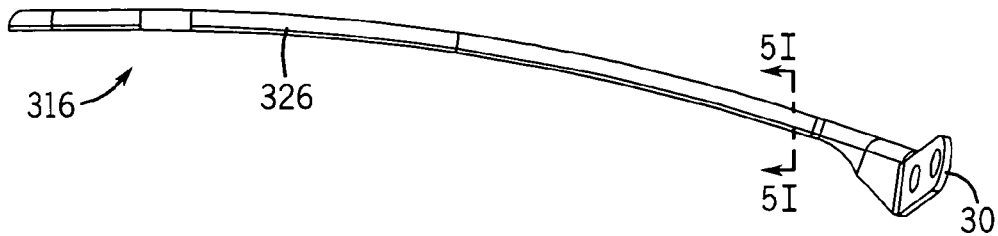
Figure 5E:
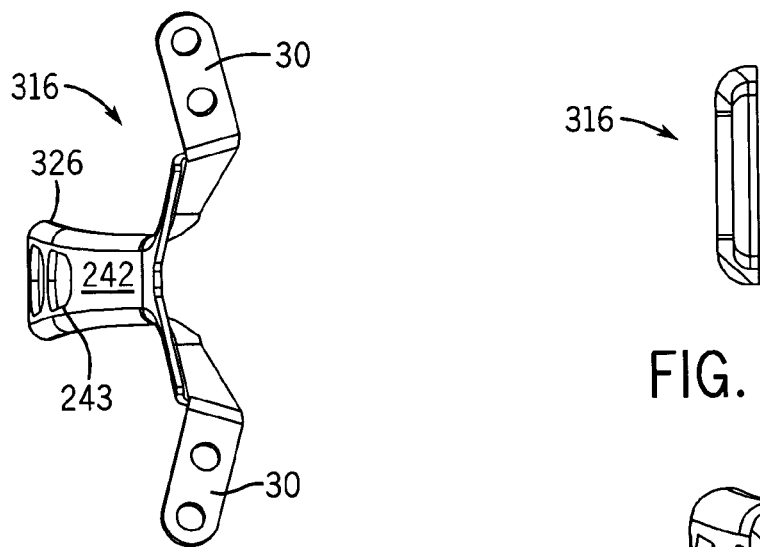
Figure 5F:
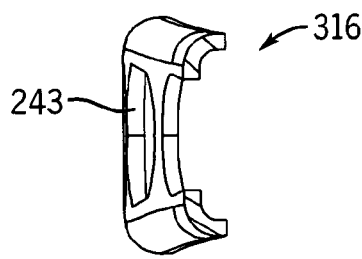
FIGS. 5F, 5G, 5H, and 5I are section views of the core of FIGS. 5C and 5D taken along lines 5F-5F, 5G-5G, 5H-5H, and 5I-5I.
Figure 5G:
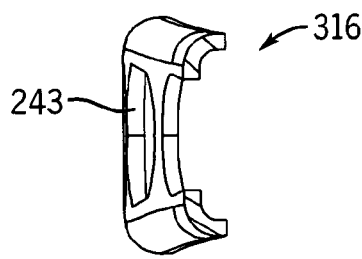
Figure 5H:
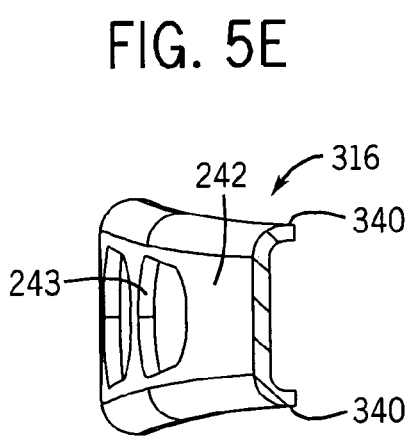
Figure 5I:
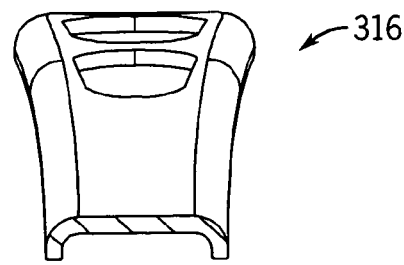

FIGS. 5A and 5B illustrate handle 314, another embodiment of handle 14 shown in FIGS. 1 and 2. FIGS. 5C-5I illustrate core 316 of handle 314. Handle 314 is similar to handle 214 (shown in FIGS. 4A-4G) except that handle 314 includes core 316. Core 316 is similar to core 216 except that core 316 includes girders 340 in lieu of girders 240. Girders 340 of insert portion 326 continuously extend along opposite sides of insert portion 326 and along opposite edges of handle 314 on a longitudinal axis of handle 314. As shown by FIGS. 5F-5H, girder 340 comprise portions that are down turned from bridge portion 242. In addition as shown by FIG. 5I, girders 340 extend in an arc along a length of handle 314. This arc further enhances structural rigidity and load bearing capacity of handle 314.

Figure 6A:
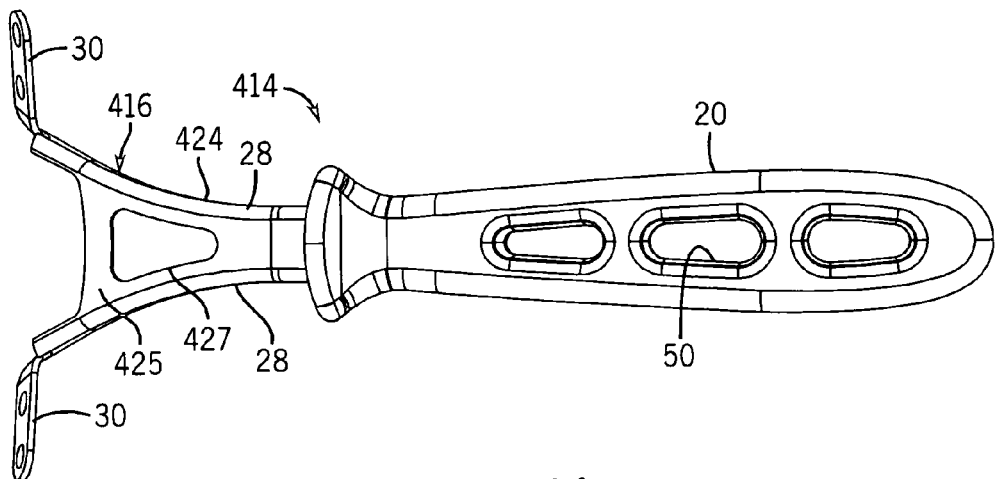
FIGS. 6A and 6B show a top view and a side view of a handle according to an exemplary embodiment.
Figure 6B:
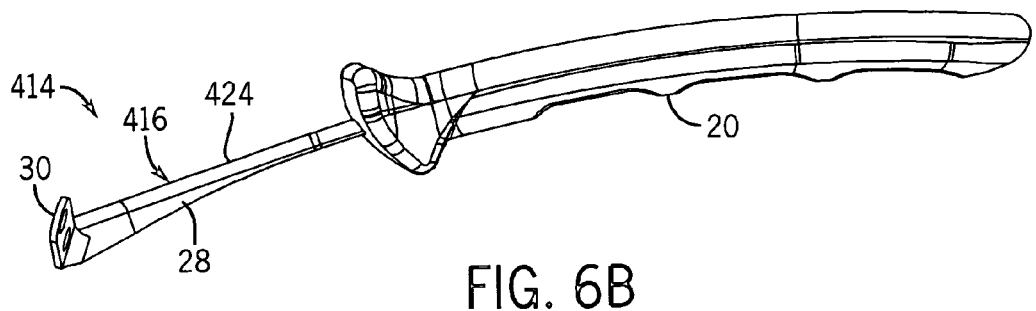

FIGS. 6A and 6B illustrate handle 414, yet another embodiment of handle 14 shown in FIGS. 1 and 2. FIGS. 6C-6I illustrate core 416 of handle 414. Handle 414 is similar to handle 314 except that handle 414 includes core 416 in lieu of core 316. Core 416 is itself similar to core 316 except that core 416 has a greater axial length as compared to core 316 and has a longer head portion 424 as compared to handle 316. Head portion 424 additionally includes bridge portion 425. Bridge portion 425 bridges between beams 28 so as to rigidify beams 28 and head portion 424. In the particular embodiment shown, bridge portion 425 comprises a relatively thin expanse, such as a panel, of rigid material such as metal. In the particular embodiment shown, bridge portion 425 is integrally formed as a single unitary body with beams 428. In the exemplary embodiment, bridge portion 425 is further integrally formed as part of a single unitary body with the entirety of core 416. As a result, core 416 is simpler and less expensive to manufacture. Although not utilizing a large amount of material, bridge portion 425 strengthens core 416 and strengthens handle 414.

Figure 6C:
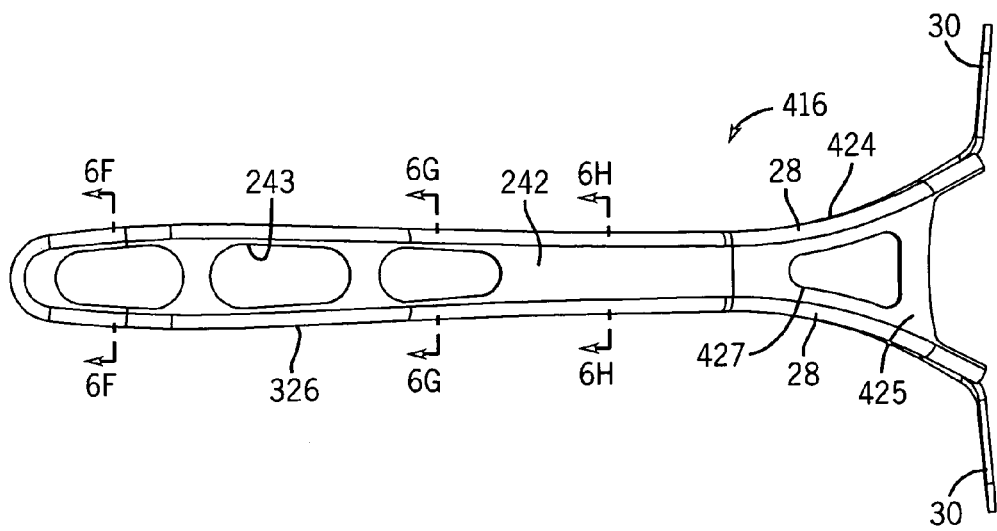
FIGS. 6C, 6D, and 6E are top, side, and end views of a core for the handle of FIGS. 6A and 6B according to an exemplary embodiment.
Figure 6D:
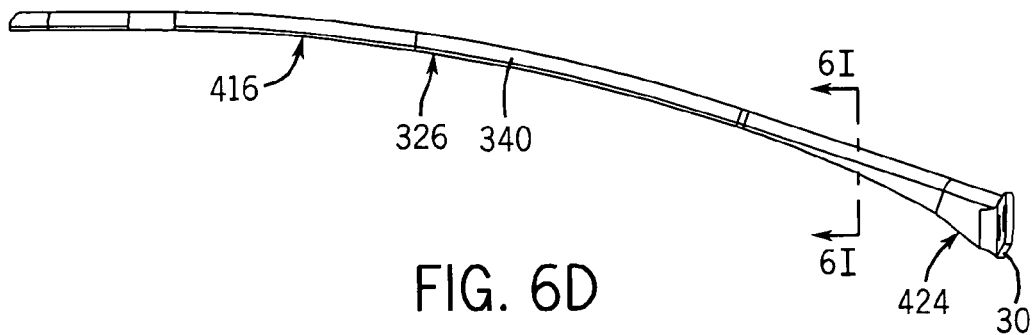
Figure 6E:
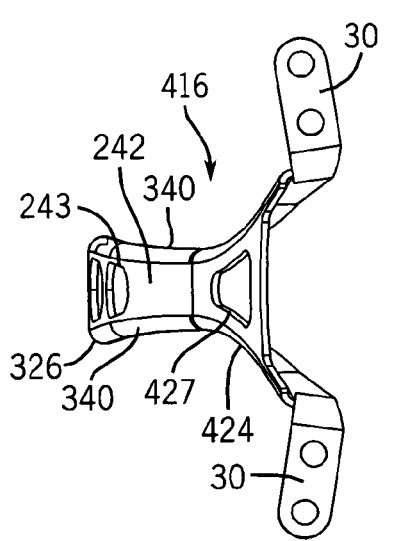
Figure 6F:
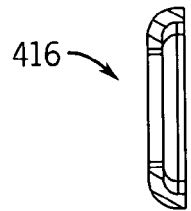
FIGS. 6F, 6G, 6H, and 6I are section views of the core of FIGS. 6C and 6D taken along lines 6F-6F, 6G-6G, 6H-6H, and 6I-6I.
Figure 6G:
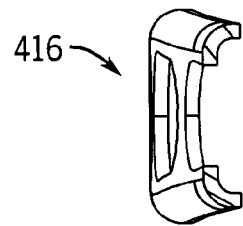
Figure 6H:
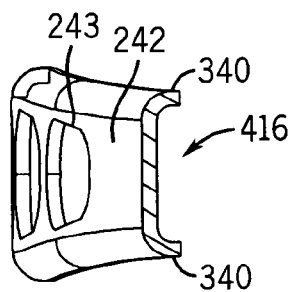
Figure 6I:
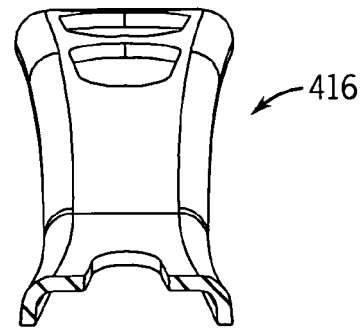

As further shown by FIGS. 6A-6C, bridge portion 425 additionally includes opening 427. Opening 427 extends through bridge portion 425. Opening 427 facilitates dissipation of heat from beams 428 and bridge portion 425. In addition, opening 427 lessens the weight of handle 414.

Figure 7A:
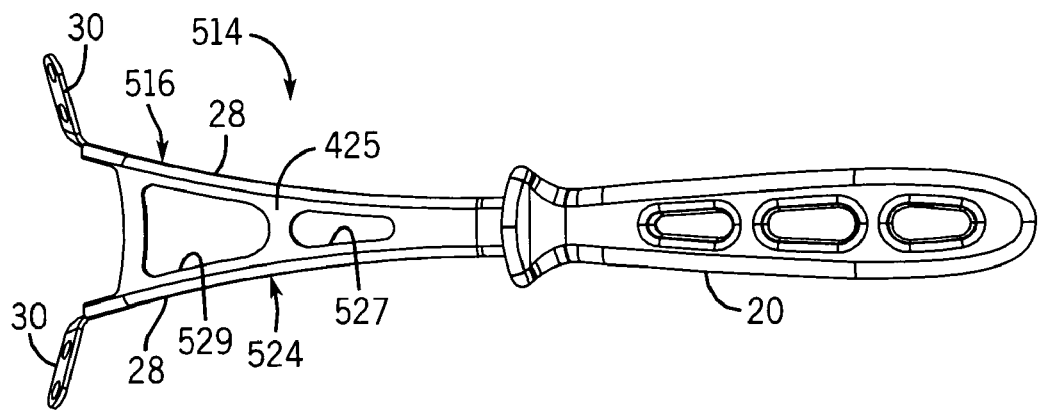
FIGS. 7A and 7B disclose a handle according to an exemplary embodiment.
Figure 7B:
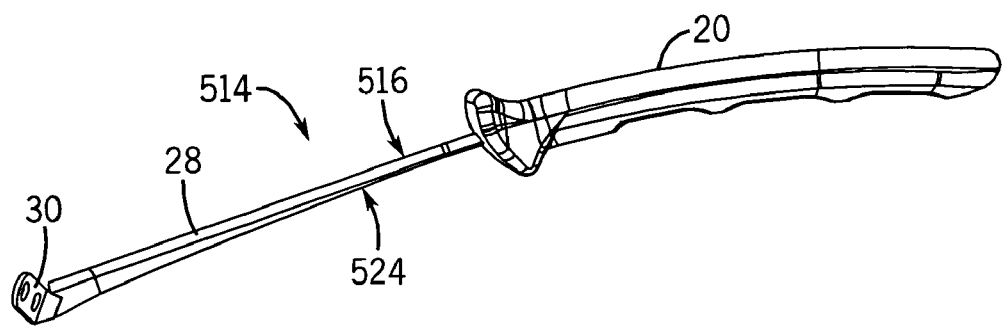

FIGS. 7A and 7B illustrate handle 514, another embodiment of handle 14 shown in FIGS. 1 and 2. Handle 514 is similar to handle 414 except that handle 514 includes core 516 in lieu of core 416. Core 516 is similar to core 416 except that core 516 includes head portion 524 in lieu of head portion 424. Head portion 524 is axially longer than head portion 424 and includes a pair of openings 527, 529 within bridge portion 425. The longer length of head portion 524 spaces grip 20 of handle 514 from receptacle 12 (shown in FIGS. 1 and 2) by a greater distance, spacing a person's hand a further distance from a source of heat heating the contents of receptacle 12. Openings 527 and 529 further enhance dissipation of heat from beams 28 and bridge portion 425 while also reducing the weight of handle 514. Like bridge structure 425 in handle 414, bridge structure 425 and handle 514 further strengthens and rigidifies head portion 524 with little additional material.

FIGS. 8A-8J illustrate pan 510, another embodiment of pan 10. Pan 510 is similar to pan 10 except that pan 510 includes handle 514 in lieu of handle 14. Handle 514 generally includes core 516 and omits grip 20. As shown by FIGS. 8C-8J, core 516 is similar to core 416 (shown in FIG. 6C) except that core 516 has a head portion 524 which necks down at neck 525 generally between beams 28 and insert portion 526 of core 516. Because neck 525 has a reduced width as compared to portions of beams 28 which converge towards mounting flanges 30 and insert portion 526, less heat is conducted to insert portion 526. This is especially beneficial with regards to pan 510 in which grip 20 is omitted.

Figure 8E:
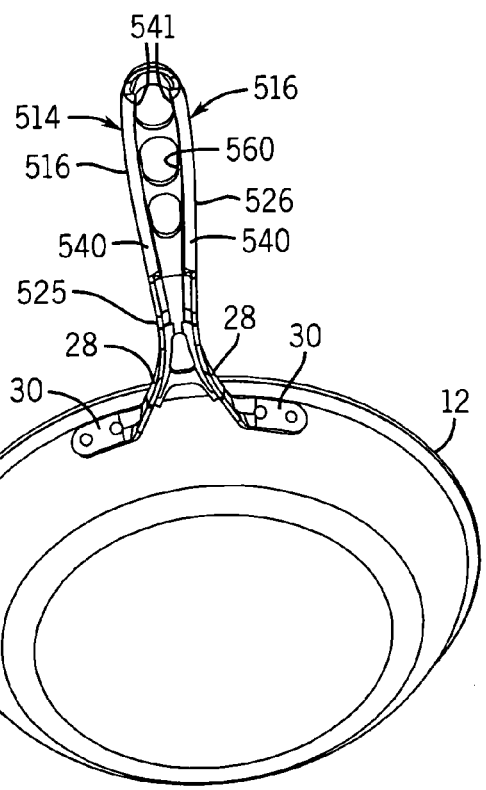
Figure 8F:
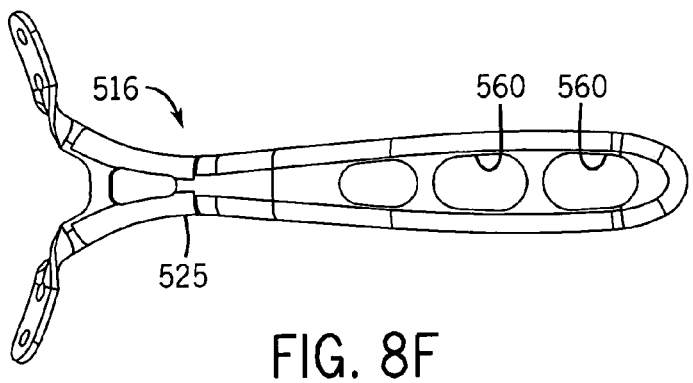
FIGS. 8F, 8G, 8H, 8I and 8J are top, side, bottom, end, perspective views of a core for the handle shown in FIG. 8C.
Figure 8G:
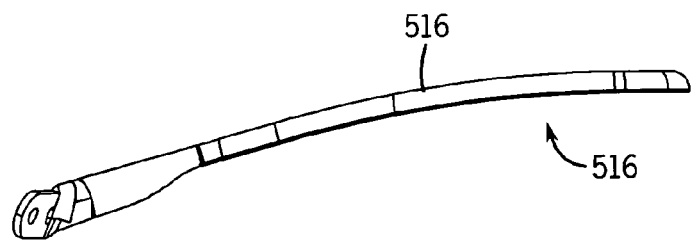
Figure 8H:
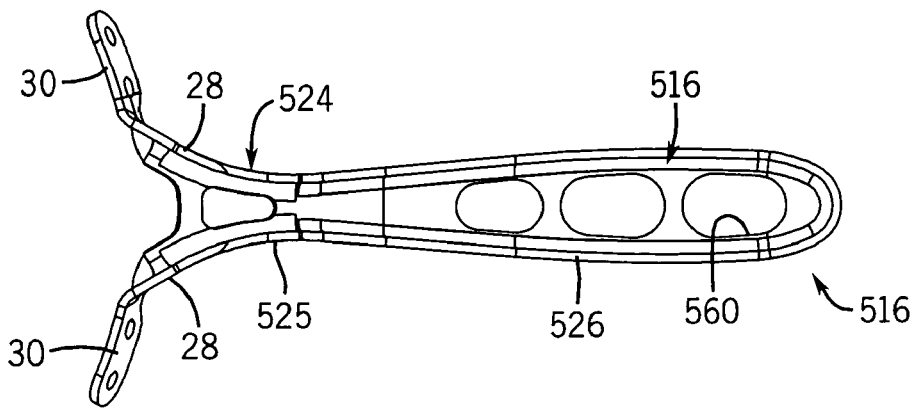
Figure 8I:
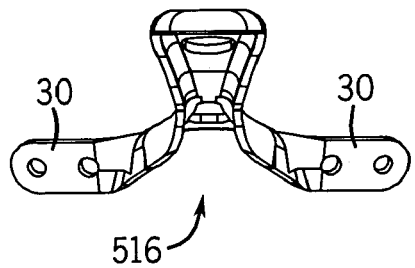
Figure 8J:
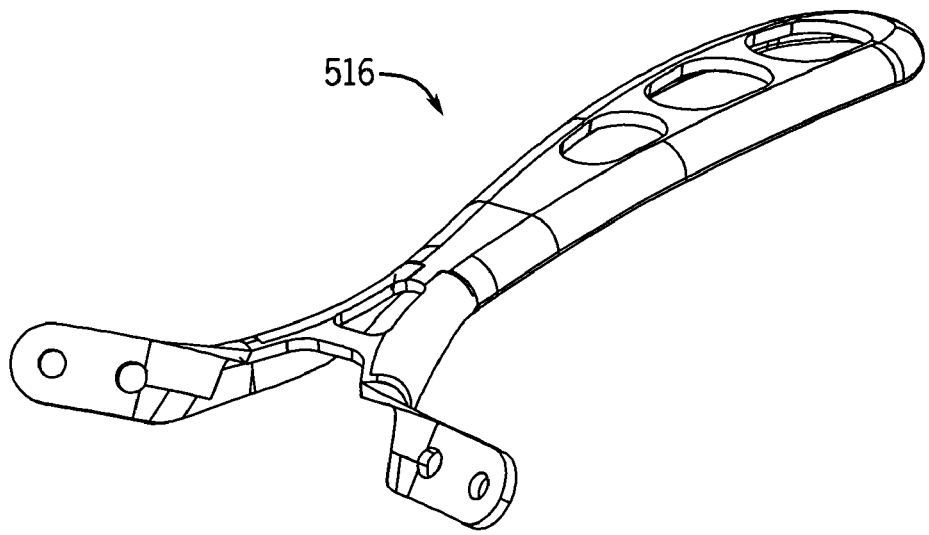

As further shown by FIG. 8E, insert portion 526 of core 516 additionally includes in turned edges 543. In-turned edges 543 comprise the material integrally formed with girders 540 and extending towards one another on an underside of core 516. Edges 543 provide insert portion 526 of core 516 with rounded spides that may be more easily grasped by a person's hand. The in-turned edges are also intended to provide comfort and stability to the hand of the user. As a result, insert portion 526 is more ergonomic when grip 20 is omitted. Although FIGS. 8F-8I illustrate core 516 and provide example dimensions for core 516 (given in inches), in other embodiments, core 516 may have other dimensions. The surface of the grip on the underside of insert portion are generally not in contact with the hand of the user. As such, heat is intended to dissipate through the surface of the grip within the apertures (i.e., where the user's hand will not be in direct contact). If a grip is being used as shown in FIG. 9D, the wall thickness of the material between the girders and the surface of the grip on the underside of the insert portion is less than the wall thickness of the material between the girders and the surface of the grip intended to come in contact with the hand of the user for improved or additional heat dissipation relative to the other portions of the grip.

Figure 9A:
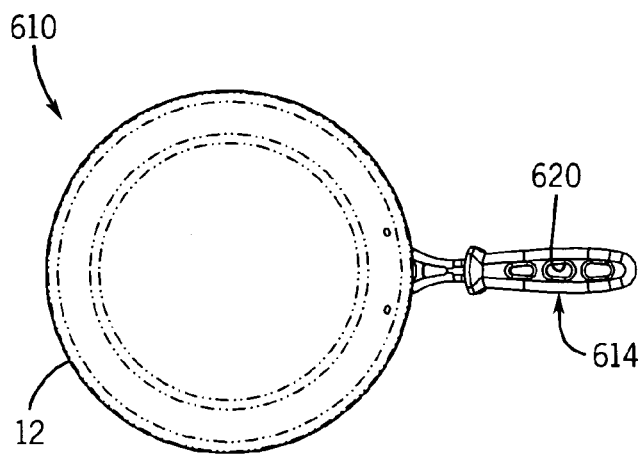
FIGS. 9A and 9B are top and side views of a pan with a handle according to an exemplary embodiment.
Figure 9B:
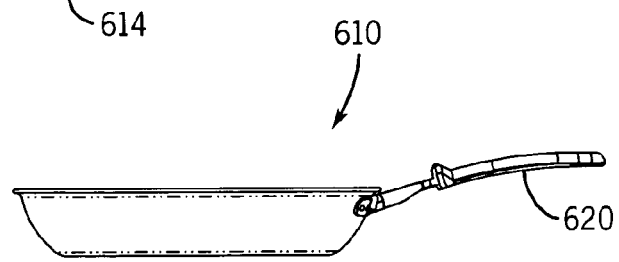
Figure 9C:
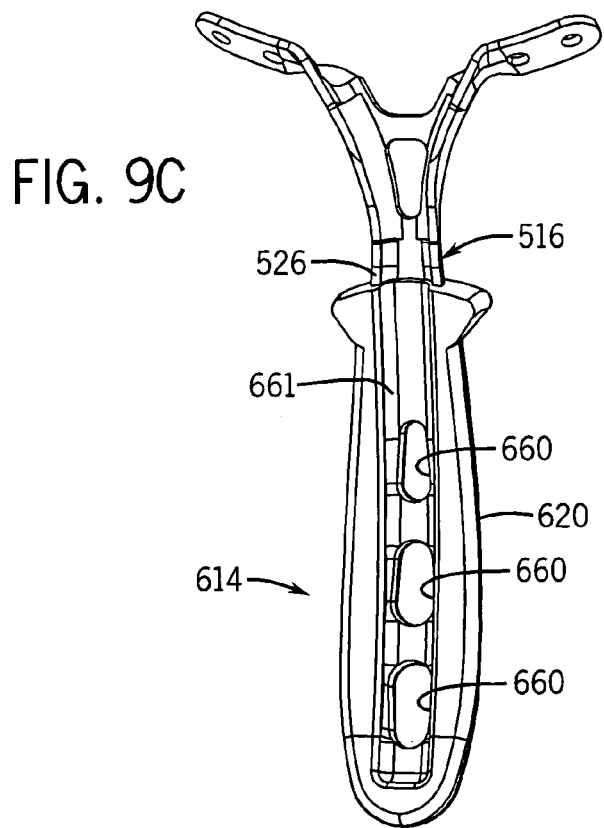
FIG. 9C is a bottom view of the handle of FIG. 9A.
Figure 9D:
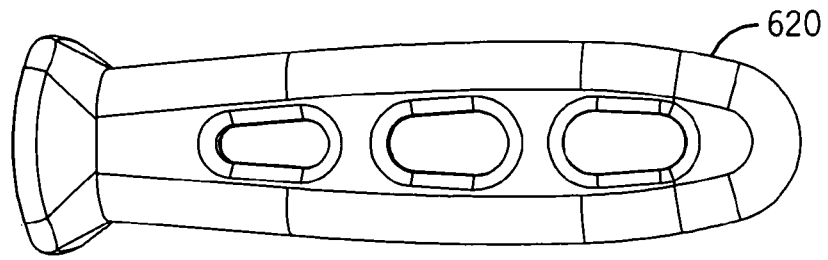
FIGS. 9D, 9E, 9F, and 9G are top, side, bottom, and end views of a grip of FIG. 9C.
Figure 9E:
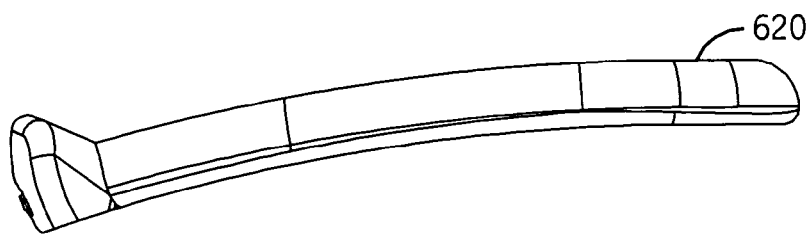
Figure 9F:
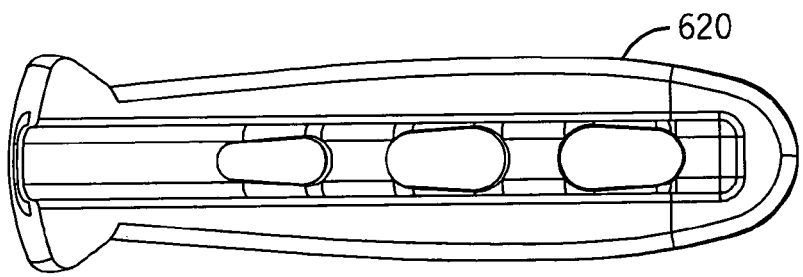
Figure 9G:
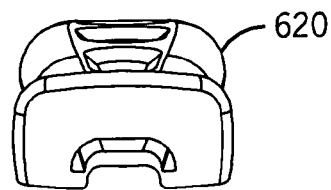
Figure 10E:
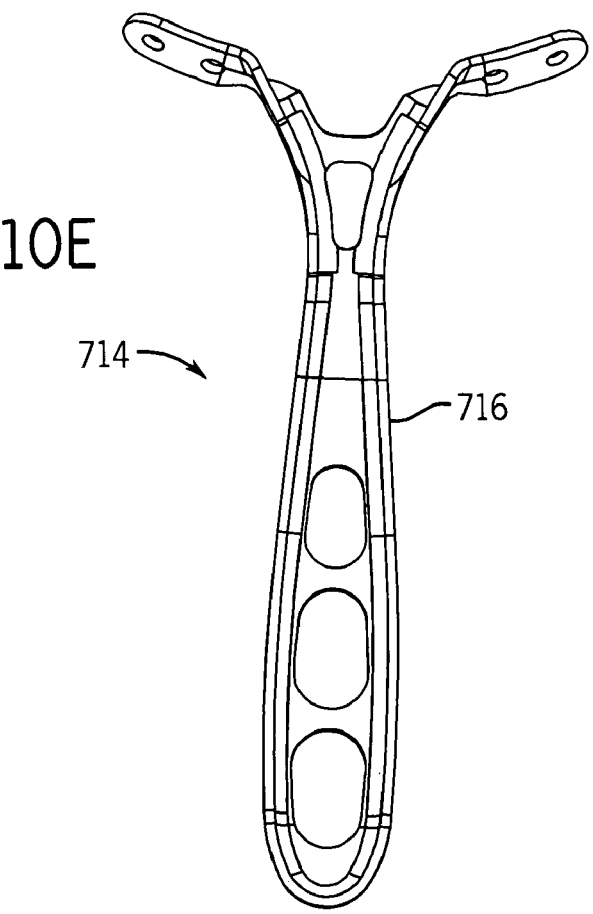
Figure 10F:
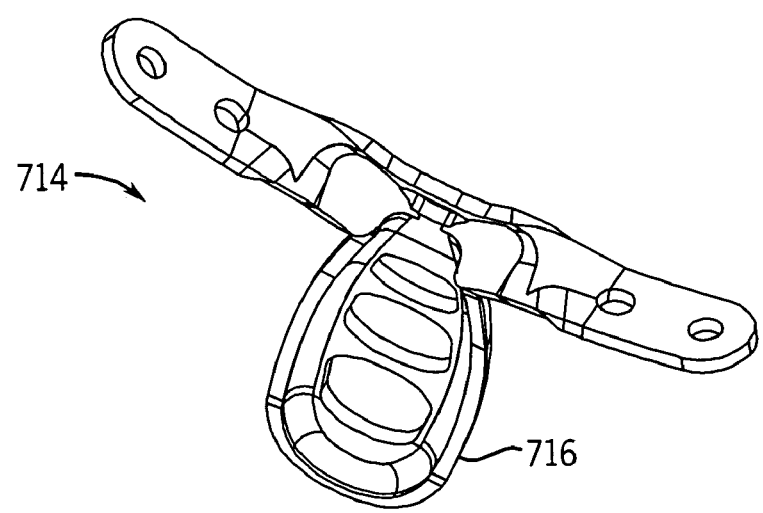
Figure 10G:
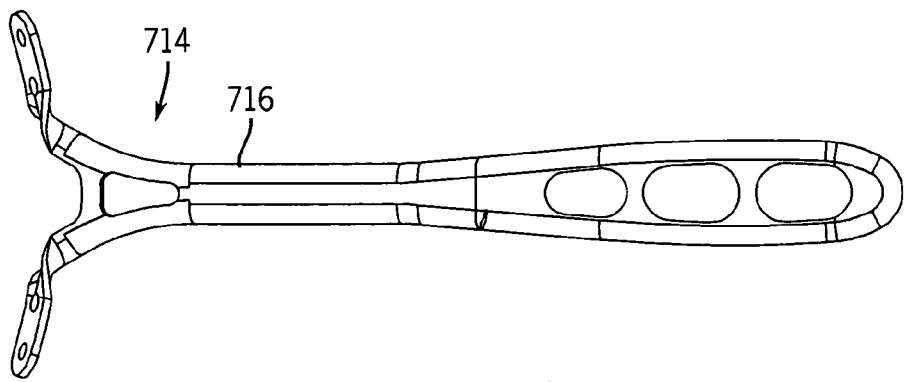
Figure 10H:
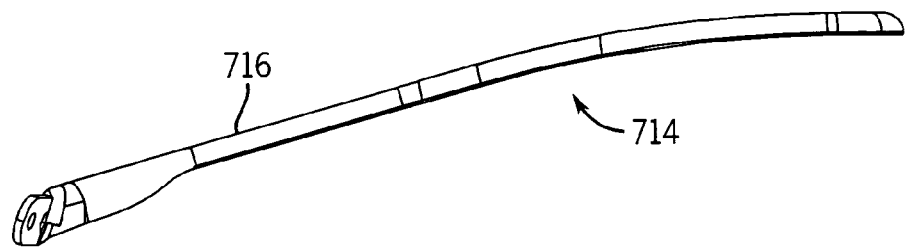
Figure 10I:
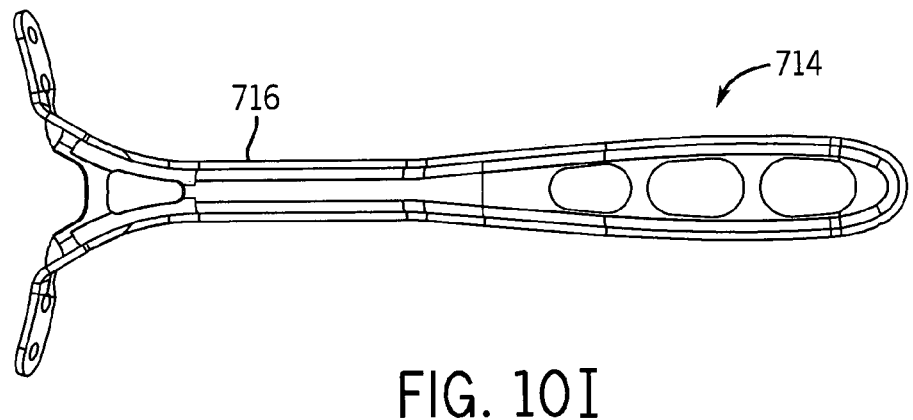
Figure 10J:
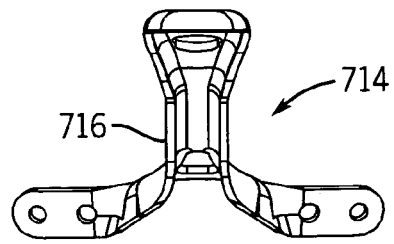
Figure 11A:
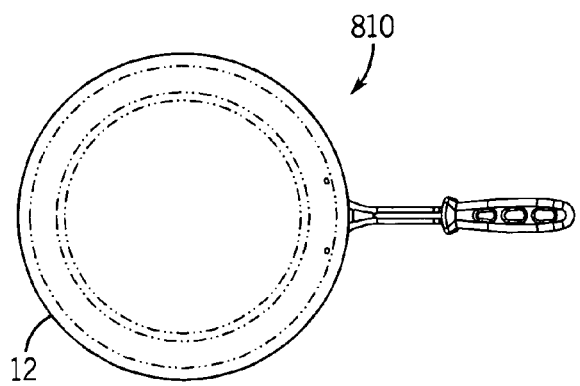
FIGS. 11A and 11B are top and side views of a pan with a handle according to an exemplary embodiment.
Figure 11B:
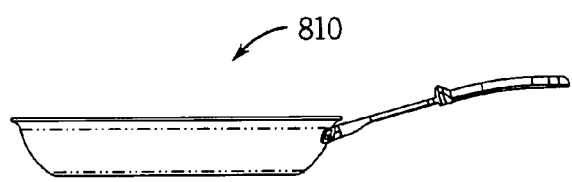
Figure 11C:
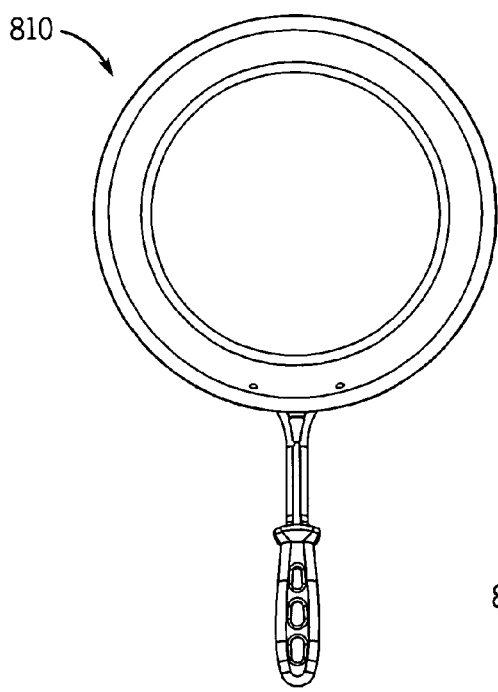
FIGS. 11C, 11D, 11E, 11F, 11G, 11H, and 11I are top, end, perspective, side, and bottom views of the pan and handle of FIG. 11A.
Figure 11D:
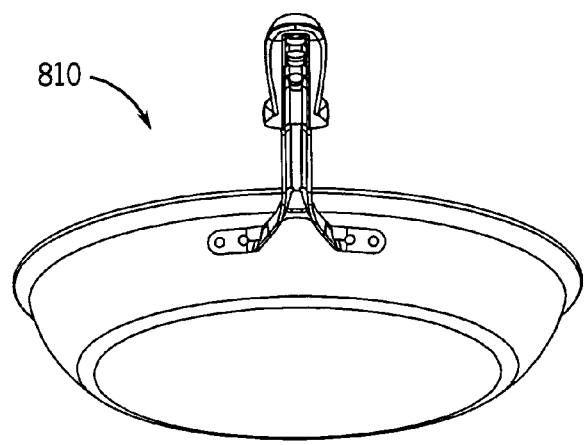
Figure 11E:
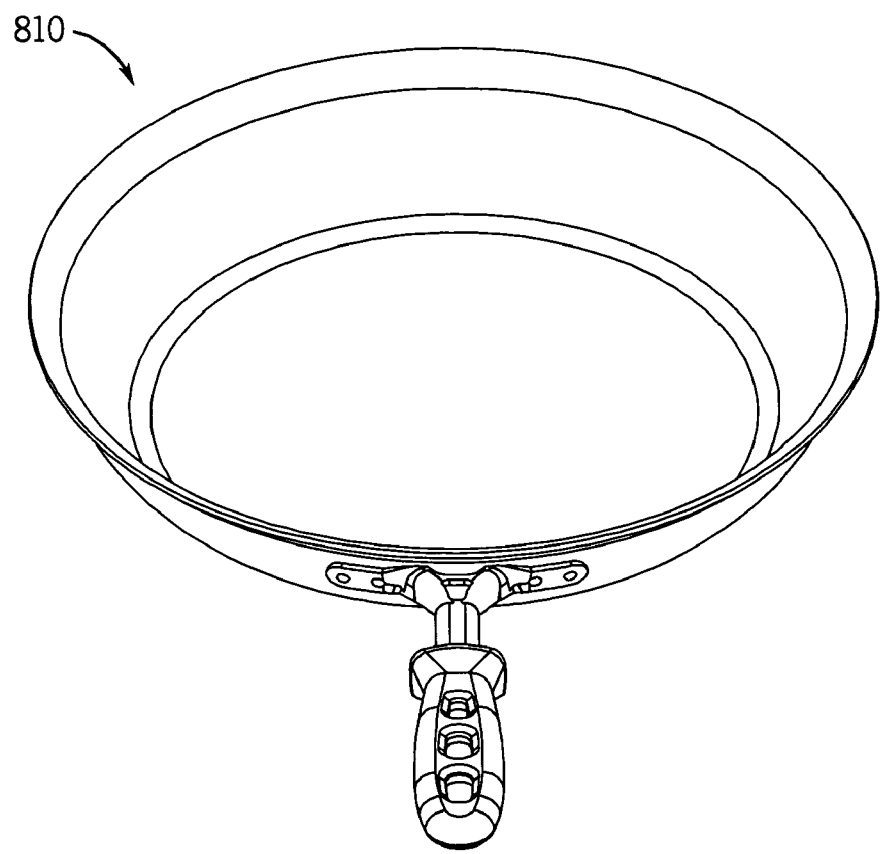
Figure 11F:
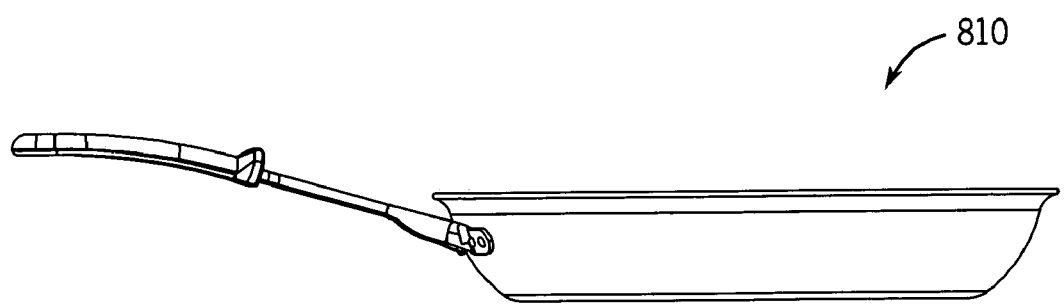
Figure 11G:
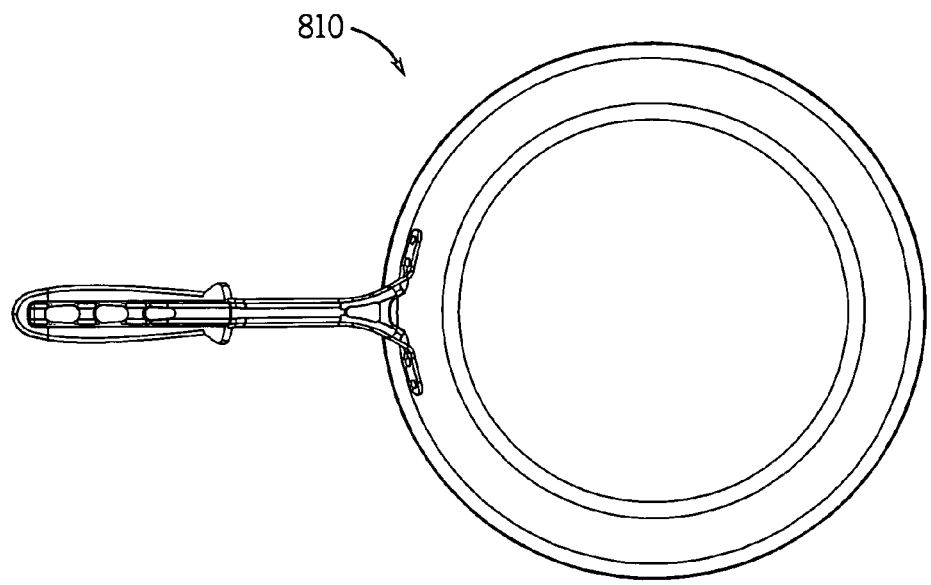
Figure 11H:
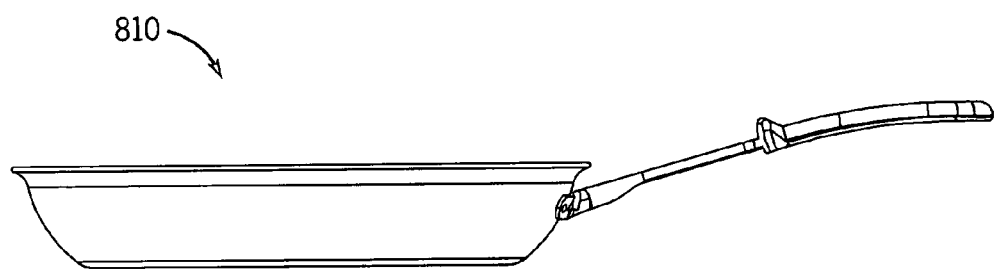
Figure 11I:
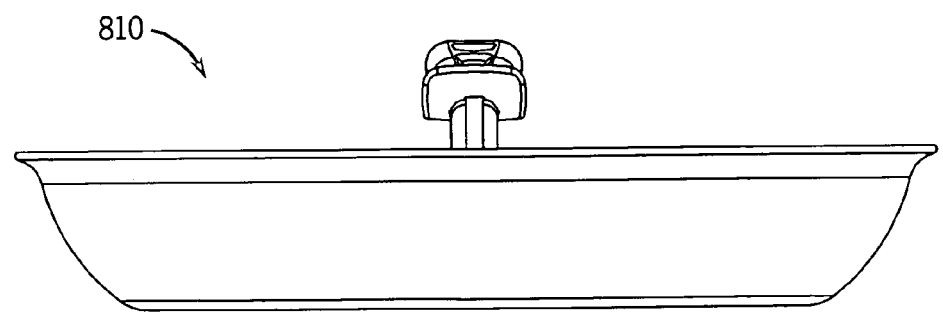
Figure 12A:
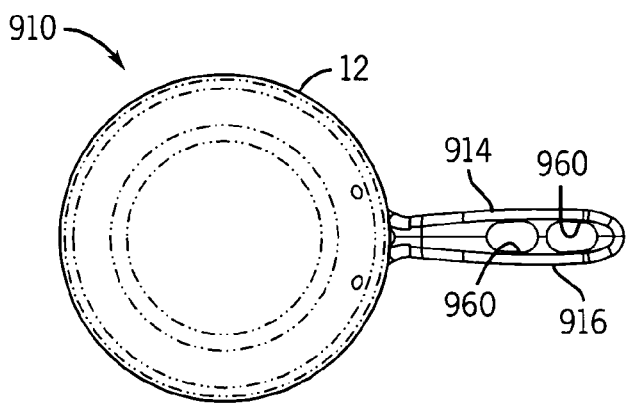
FIGS. 12A and 12B are top and side views of a handle and pan according to an exemplary embodiment.
Figure 12B:
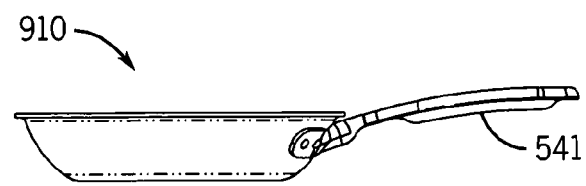
Figure 12C:
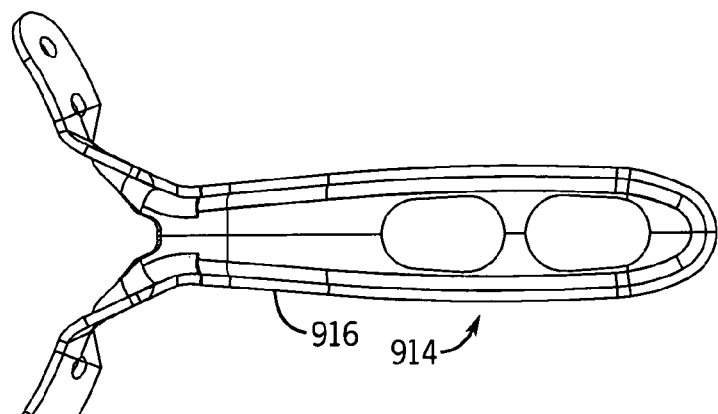
FIGS. 12C, 12D, 12E, and 12F are top, side, bottom, and end views of a core for the handle of FIG. 12A.
Figure 12D:
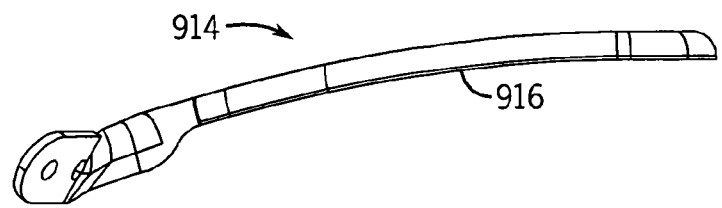
Figure 12E:
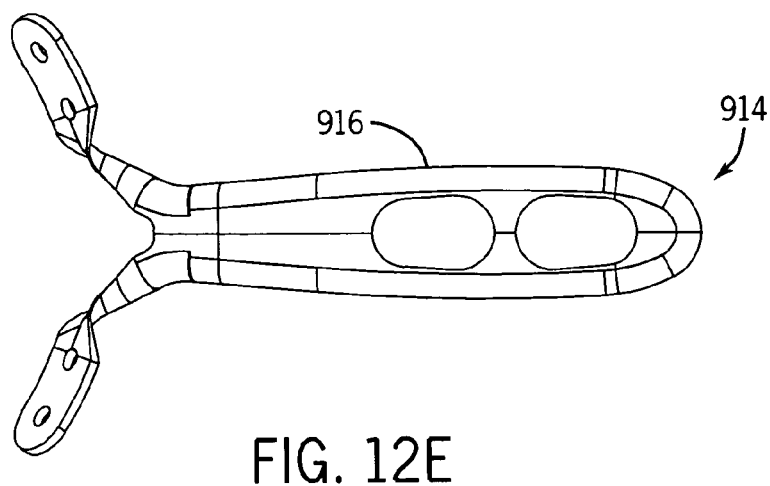
Figure 12F:
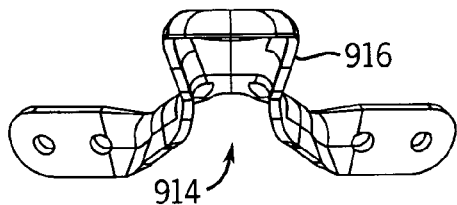

FIGS. 9A-9F illustrate pan 610, another embodiment of pan 10. Pan 610 is similar to pan 510 (shown in FIGS. 8A-8J), except that pan 610 additionally includes grip 620. FIGS. 9C-9G illustrate grip 620 in more detail. As shown by FIG. 9C, grip 620 extends about insert portion 526 of core 516. Grip 620 provides a person a more comfortable ergonomic structure by which to grasp and manipulate pan 610. In one embodiment, grip 620 is formed from a material having a lower conductivity as compared to the material or materials of insert portion 526. According to one exemplary embodiment, grip 620 may be formed from a polymeric material that is overmolded about insert portion 526. In one embodiment, grip 620 may be formed from silicone. In other embodiments, grip 620 may be formed from any of a variety of other materials and may be secured about insert portion 526 of core 516 in other fashions.

As further shown by FIGS. 9C-9G, grip 620 includes multiple (e.g., plurality, series, etc.) apertures 660 and an underlying cavity 661. Apertures 660 pass through grip 620 and pass through and between girders 640 (shown and described with respect to FIG. 8E) of insert portion 526. Apertures 660 further facilitate dissipation of heat that may be conducted through girders 540 from receptacle 12 (shown in FIG. 9A). As a result, handle 614 may be more easily grasped while receptacle 12 is being exposed to high temperatures.

Cavity 661 extends along an underside of handle 614 and provides a void. Cavity 661 generally extends between girder 640 of insert portion 526 (shown in FIG. 8E). As a result, heat within girders 540 is more easily dissipated. In addition, the weight of handle 614 is reduced as well as its cost of manufacture. In other embodiments, apertures 660 and/or cavity 661 may be omitted.

FIGS. 10A-10J illustrate pan 710, another embodiment of pan 10. Pan 710 is similar to pan 510 except that pan 710 has a handle 714 including core 716 in lieu of core 516. Core 716 is similar to core 516 except that core 716 includes neck 725 which is longer as compared to neck 525 of core 516. The increased length of neck 725 further spaces insert portion 526 of core 716 away from receptacle 12 (shown in FIG. 11). As a result, a user's or person's hand grasping handle 714 is further spaced from a source of heat heating the contents of receptacle 12. The additional length of neck 725 further provides an enlarged surface area by which heat inherently being conducted through neck 725 may dissipate.

As with the cores of pans 510 and 610, core 716 of pan 710 is also formed from a generally rigid material such as steel, iron or aluminum. In other embodiments, core 716 may be formed from other materials.

FIGS. 11A-11I illustrate pan 810, another embodiment of pan 10. Pan 810 is similar to pan 710 except that pan 810 additionally includes grip 620 shown and described above with respect to pan 610.

FIGS. 12A-12F illustrate pan 910, another embodiment of pan 10. Pan 910 generally includes receptacle 12 (described above with respect to pan 10) and handle 914. Handle 914 is similar to handle 514 of pan 510 except that handle 914 is shorter in length. Like handle 514, handle 914 includes a core 916 while omitting a cover layer or layers of one or more materials, such as silicone, about core 916. In the particular example illustrated, core 916 comprises a rigid structure formed from a metal such as aluminum, steel or iron, or mixtures or alloys thereof, which is connected to receptacle 12. Like core 516, core 916 includes inward turned flanges or edges 541 (shown in FIG. 12B) which enhance grasping of core 916 without an overlying cover layer of material. Unlike core 516, core 916 includes two openings or apertures 960 rather than three apertures due to its shorter length. However, in other embodiments, core 916, as well as core 516, may have a greater or fewer number of such apertures.

FIGS. 13A-13F illustrate pan 1010, another embodiment of pan 10. Pan 110 is similar to pan 910 (shown in FIGS. 12A-12F) except that pan 1010 additionally includes grip 1020. Those remaining elements of pan 1010 which correspond to elements of pan 910 are numbered similarly. Grip 1020 comprises one or more layers of one or more materials extending about core 916. In the particular example illustrated, grip 1020 comprises a layer of material having a lower thermal conductivity as compared to the one or more materials forming core 916. As a result, grip 1020 insulates or slows the conduction of heat from core 916 to a person's hand grasping grip 1020.

In the particular example illustrated, grip 1020 comprises a layer of silicone overmolded about core 916 while preserving openings 960. In other embodiments, grip 1020 may alternatively comprise a layer of material, such as silicone, overmolded about core 916 so as to fill in openings 960 in the insert portion of core 916. In still other embodiments, grip 1020 may alternatively comprise one or more layers of materials, such as layers of material configured to form a sleeve, slid or otherwise positioned over and about core 916. In particular embodiments, the one or more layers otherwise positioned about core 916 and forming grip 1020 may be secured to core 916 by fasteners, welding, adhesives or other securement methods.

Figure 13A:
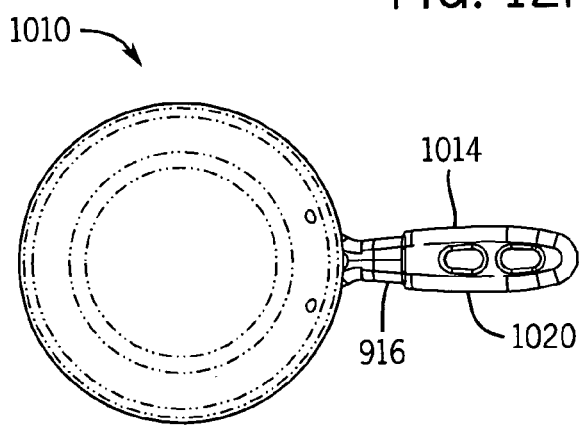
FIGS. 13A and 13B are top and side views of a pan according to a exemplary embodiment.
Figure 13B:
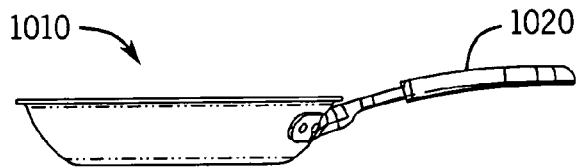
Figure 13C:
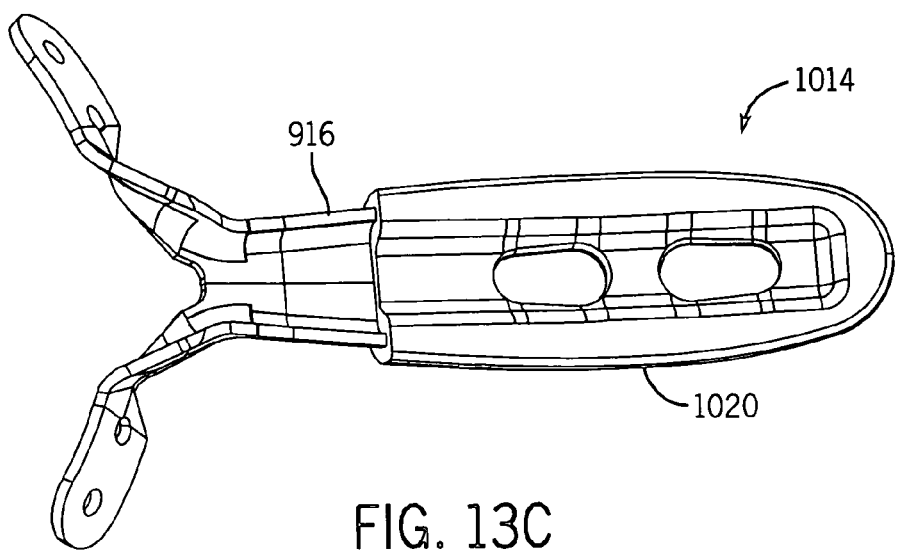
FIGS. 13C and 13D are bottom and top perspective views of the handle of FIG. 13A.
Figure 13D:
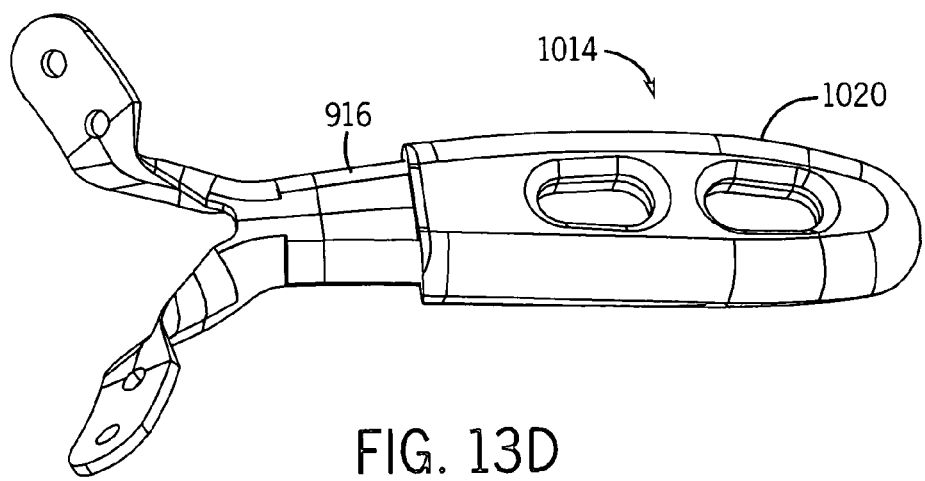
Figure 13E:
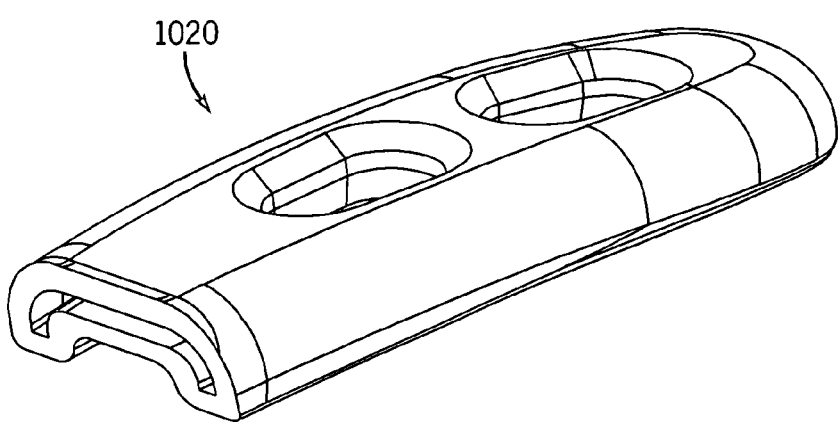
FIGS. 13E and 13F are perspective and bottom views of the grip for the handle shown in FIG. 13C.
Figure 13F:
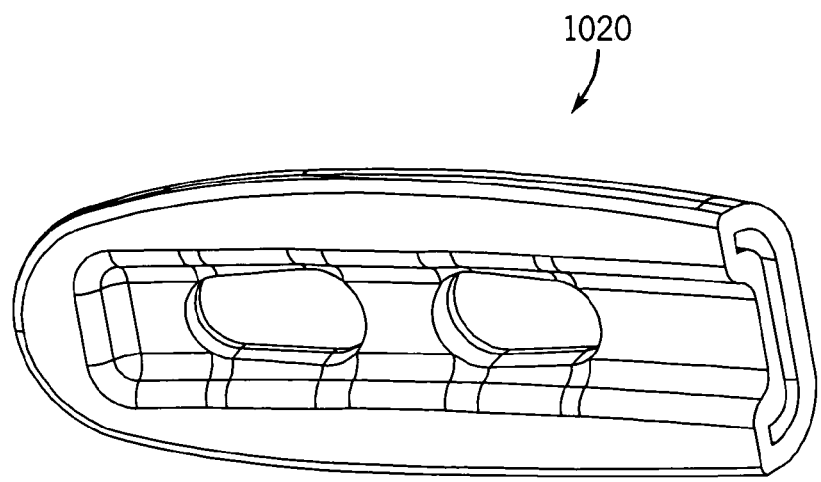

Like pans 10, 110, 210, 310, 410, 510, 610, 710, 810 and 910, pan 1010 is configured and is dimensioned so as to be lightweight and easily grasped while providing a desirable center of mass that facilitates easy handling and manipulation of pan 1010. Although FIGS. 13A and 13B provides sample dimensions (given in inches) for one example of a pan 1010, in other embodiments, pan 1010 may have other dimensions.

Figure 14A:
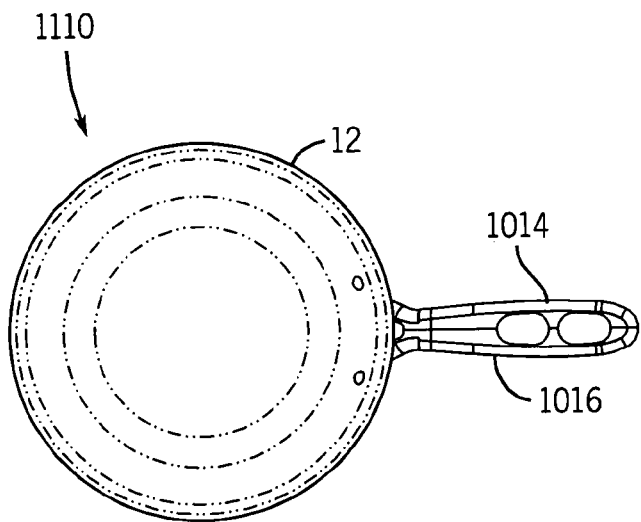
FIGS. 14A and 14B are top and side views of a pan according to an exemplary embodiment.
Figure 14B:
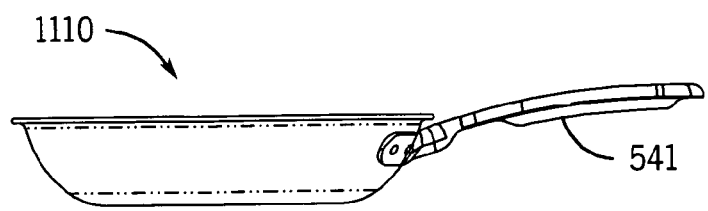

FIGS. 14A and 14B illustrate pan 110, another embodiment of pan 10. Pan 1110 is similar to pan 910 except that pan 1110 has an enlarged receptacle 12 and also has handle 1014 which is enlarged as compared to handle 914. In particular, handle 1014 has a core 1016 which is enlarged as compared to core 916. The remaining structures of pan 1110 are substantially similar to those of pan 910.

Figure 15A:
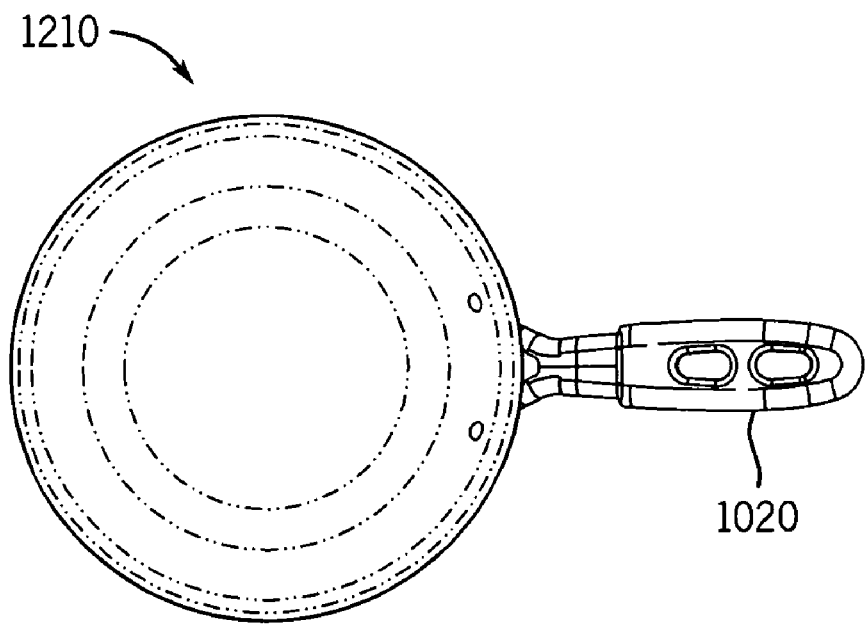
FIGS. 15A and 15B are top and side views of a pan according to an exemplary embodiment.
Figure 15B:
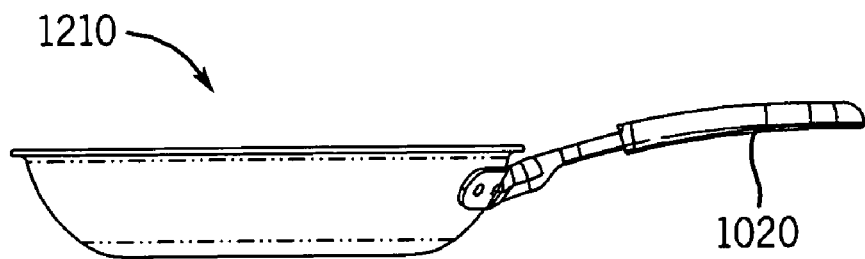

FIGS. 15A and 15B illustrate pan 1210, another embodiment of pan 10. Pan 1210 is similar to pan 1110 except that pan 1210 additionally includes grip 1020 (shown and described with respect to pan 1010).

Overall, handles 14, 114, 214, 314, 414, 514, 614, 714, 814, 914, 1014, 1114 and 1214 provide strong lightweight and heat resistive handles for pans, trays or other utensils, particularly kitchen and food preparation utensils. As noted above, because beams 28 and girders 40, 240, 340 and 540 have upwardly facing dimensions or thicknesses which are substantially less than the horizontally or sideways facing dimensions (length and width) of such beams (on the order of less than one-half to less than less than one-quarter the height of such beams), such girders are rigid, strong and utilize less material. The less material lightens such handles and lessens the conduction of heat from receptacle 12. Because head portion 424 and head portion 524 are bifurcated, dissipation of heat is further enhanced and a more stable connection to receptacle 12 is provided. Beams 28 further space grip 20 from receptacle 12, allowing the handles to be more easily grasped under high temperature conditions. Apertures 50 between girders 40, 240, 340 and 540 further enhance dissipation of heat and reduce the weight of such handles. Bridge portions 242 further strengthen insert portion 226 while bridge portions 425 strengthen head portion 424. Openings 427, 527 and 529 enhance head dissipation and reduce weight.

Although the proceeding detailed description of the exemplary, preferred, and alternative embodiments have been described with reference to example embodiments, several comments can be made about the general applicability and the scope thereof. First, while the components of the disclosed embodiments will be illustrated as a handle coupled to cookware or a pan, the features of the disclosed embodiments have a much wider applicability. For example, the handle design is adaptable for other utensils or tools, and other home, commercial, office, or industrial products which employ a structure configured to facilitate manual lifting and movement by the user's hand. Further, the size of the various components and the size of the containers can be widely varied.

Second, the particular materials used to construct the exemplary embodiments are also illustrative. For example, silicone is the preferred material for making the grip, but other materials can be used, including other elastomer, thermoset, or thermoplastic resins such as polysulphone. Also, other molding operations may be used to form these components, such as casting, compression molding, etc. The plastic may be injection molded, compression molded, transfer molded, or the like. Components of the core can also be manufactured from cast, forged, or stamped metal or alloy materials such as steel or aluminum.

Third, it is important to note that the term "beams," "girders," "bridge", and "grip" are intended to be broad terms and not terms of limitation. These components may be used with any of a variety of products or arrangements and are not intended to be limited to use with cookware applications.

It is also important to note that the construction and arrangement of the elements of the handle as shown in the preferred and other exemplary embodiments are illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the claims. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and/or omissions may be made in the design, operating conditions and arrangement of the preferred and other exemplary embodiments without departing from the spirit of the present invention as expressed in the appended claims.

What is claimed is:

1. An apparatus comprising:
   a receptacle;
   a handle coupled to the receptacle, the handle having
      a grip mounting portion comprising a first member having a first lateral dimension larger than a second lateral dimension, a second member having a first lateral dimension larger than a second lateral dimension and spaced apart from the first member, and at least one aperture defined at least partially by the first member and the second member;
      a polymeric grip overmolded to the grip mounting portion so that the grip is in substantial continuous contact with the grip mounting portion and comprising a first heat dissipation aperture and a second heat dissipation aperture;
   wherein the first heat dissipation aperture extends through the grip mounting portion and through the polymeric grip between an upper surface and a lower surface and is aligned with the at least one aperture in the grip mounting portion;
   wherein the second heat dissipation aperture is spaced apart from the first heat dissipation aperture and extends through the grip mounting portion and through the polymeric grip between an upper surface and a lower surface and is aligned with the at least one aperture in the grip mounting portion; and
   wherein heat is dissipated from the handle to the environment at least partially through the first heat dissipation aperture and the second heat dissipation aperture.

2. The apparatus of claim 1 wherein the polymeric grip is spaced at least one inch from the receptacle.

3. The apparatus of claim 1 wherein the polymeric grip is a single unitary body.

4. The apparatus of claim 1 wherein the grip mounting portion is substantially formed from at least one metal.

5. The apparatus of claim 1 wherein the handle comprises a pair of beam members that are spaced apart near the receptacle a greater distance relative to the grip mounting portion.

6. The apparatus of claim 1 wherein the handle further comprises a neck having a narrower lateral dimension relative to the grip mounting portion.

7. The apparatus of claim 6 wherein the grip mounting portion is connected to the neck as a separate element.

8. The apparatus of claim 1 wherein the polymeric grip comprises a thermal conductivity lower than the grip mounting portion.

9. The apparatus of claim 8 wherein the polymeric grip comprises silicone.

10. The apparatus of claim 1 wherein the receptacle includes a basin.

11. An apparatus comprising:
    a receptacle; and
    a handle coupled to the receptacle, the handle including:
       a bifurcated head portion coupled to the receptacle; and
       a grip portion coupled to the head portion, the grip portion including a first member having a first lateral dimension larger than a second lateral dimension and extending in a direction away from the receptacle and a second member having a first lateral dimension larger than a second lateral dimension and extending in a direction away from the receptacle and spaced apart from the first member;
    wherein the head portion includes a first beam having a first lateral dimension larger than a second lateral dimension and extending from the grip portion and coupled to the receptacle and a second beam having a first lateral dimension larger than a second lateral dimension and extending from the grip portion and coupled to the receptacle;
    wherein the first beam and the second beam diverge out from the grip portion as the beams extend from the grip portion towards the receptacle such that the beams near the receptacle are spaced apart a greater distance relative to the grip portion;
    wherein a lower portion of the first member includes an in-turned edge, a lower portion of the second member includes an in-turned edge, and the grip portion comprises an underlying cavity that extends along an underside of the grip portion and defined by the in-turned edges and members.

12. The apparatus of claim 11 wherein the grip portion comprises:
    a first heat dissipation aperture extending through the grip portion between an upper surface and the lower surface; and
    a second heat dissipation aperture spaced apart from the first heat dissipation aperture and extending through the grip portion between the upper surface and the lower surface;
    wherein heat is dissipated from the handle to the environment at least partially through the first heat dissipation aperture and the second heat dissipation aperture.

13. The apparatus of claim 12 further comprising a polymeric grip overmolded about the grip portion.

14. The apparatus of claim 11 wherein the receptacle includes a basin.

15. The apparatus of claim 11 wherein the handle is integrally formed as a single unitary body.

16. The apparatus of claim 11 wherein the first member and first beam and the second member and second beam are integrally formed with one another as part of a single unitary body.

17. The apparatus of claim 11 wherein the grip portion further comprises a bridge portion bridging the first member and the second member.

18. The apparatus of claim 17 wherein the bridge portion is integrally formed as part of a single unitary body with the first member and the second member.

19. The apparatus of claim 18 wherein the members extend in an arc in a vertical plane from a first end of the grip portion to a second end of the grip portion along a length of the handle.

20. The apparatus of claim 19 wherein the arc is a continuous arc along the length of the handle.

21. The apparatus of claim 19 wherein the handle extends in an arc in a vertical plane from a first end of the handle proximate the receptacle to a second end of the handle away from the receptacle.

22. The apparatus of claim 21 wherein the arc is a continuous arc along the length of the handle.

23. The apparatus of claim 11 wherein the handle further comprises a neck having a narrower lateral dimension relative to the grip portion, the neck being located between the grip portion and the head portion.

24. The apparatus of claim 23 wherein the handle extends away from the receptacle in a continuous curve in a vertical plane.

25. An apparatus comprising:
a receptacle; and
a handle comprising:
a grip mounting portion coupled to the receptacle and comprising:
a first member having a vertical dimension larger than a horizontal dimension;
a second member having a vertical dimension larger than a horizontal dimension and spaced apart from the first member;
a first bridge extending between an upper portion of the first member and an upper portion of the second member;
a second bridge extending between the upper portion of the first member and the upper portion of the second member;
a third bridge extending between the upper portion of the first member and the upper portion of the second member;
a polymeric grip tightly surrounding the grip mounting portion so that the grip is in substantial continuous contact with the grip mounting portion, the polymeric grip comprising a first heat dissipation aperture and a second heat dissipation aperture;
wherein the first heat dissipation aperture extends through the grip mounting portion and through the polymeric grip between an upper surface and a lower surface;
wherein the second heat dissipation aperture is spaced apart from the first heat dissipation aperture and extends through the grip mounting portion and through the polymeric grip between an upper surface and a lower surface;
wherein the first bridge and the second bridge define a first aperture in the grip mounting portion of the handle that is aligned with the first heat dissipation aperture and wherein the second bridge and the third bridge define a second aperture in the grip mounting portion of the handle that is aligned with the second heat dissipation aperture; and
wherein heat is dissipated from the handle to the environment at least partially through the first heat dissipation aperture and the second heat dissipation aperture.

26. The apparatus of claim 25 wherein a lower portion of the first member includes an in-turned edge, a lower portion of the second member includes an in-turned edge, and the polymeric grip comprises an underlying cavity that extends along an underside of the polymeric grip and defined by the in-turned edges, members, and bridges.

27. The apparatus of claim 25 wherein the handle comprises a pair of beam members that are spaced apart near the receptacle a greater distance relative to the grip mounting portion.

28. The apparatus of claim 25 wherein the polymeric grip is overmolded about the grip mounting portion.

29. The apparatus of claim 25 wherein the polymeric grip is a sleeve that is slid over the grip mounting portion.

30. The apparatus of claim 1 wherein the grip mounting further comprises:
a first bridge extending between an upper portion of the first member and an upper portion of the second member;
a second bridge extending between the upper portion of the first member and the upper portion of the second member;
a third bridge extending between the upper portion of the first member and the upper portion of the second member.

31. The apparatus of claim 30 wherein the first bridge and the second bridge define a first aperture in the grip mounting portion of the handle that is aligned with the first heat dissipation aperture and wherein the second bridge and the third bridge define a second aperture in the grip mounting portion of the handle that is aligned with the second heat dissipation aperture.

32. The apparatus of claim 30 further comprising a fourth bridge extending between the first member and the second member and a third heat dissipation aperture between the third bridge and the fourth bridge.

33. The apparatus of claim 32 wherein the third bridge and the fourth bridge define a third aperture in the grip mounting portion of the handle that is aligned with the third heat dissipation aperture.

34. The apparatus of claim 30 wherein a lower portion of the first member includes an in-turned edge, a lower portion of the second member includes an in-turned edge, and the polymeric grip comprises an underlying cavity that extends along an underside of the polymeric grip and defined by the in-turned edges, members, and bridges.

35. The apparatus of claim 25 further comprising a fourth bridge extending between the first member and the second member and a third heat dissipation aperture between the third bridge and the fourth bridge.

36. The apparatus of claim 35 wherein the third bridge and the fourth bridge define a third aperture in the grip mounting portion of the handle that is aligned with the third heat dissipation aperture.

37. The apparatus of claim 25 wherein the first member, second member, first bridge, second bridge, and third bridge are formed as a single unitary body.

38. The apparatus of claim 37 wherein the first member, second member, first bridge, second bridge, and third bridge are stamped and formed from a single sheet of metal.

39. The apparatus of claim 25 wherein the polymeric grip is a single unitary body.

40. The apparatus of claim 25 wherein the grip mounting portion is substantially formed from at least one metal.

41. The apparatus of claim 1 wherein the first member is located closer to an inner lateral surface of the polymeric grip than an outer lateral surface of the polymeric grip.

42. The apparatus of claim 1 wherein the polymeric grip comprises a first wall thickness between the first member and a surface of the aperture and the grip mounting portion and a second wall thickness between the first member and an outer surface of the grip.

43. The apparatus of claim 31 wherein the first member, second member, first bridge, second bridge, and third bridge are formed as a single unitary body.

44. The apparatus of claim 43 wherein the first member, second member, first bridge, second bridge, and third bridge are stamped and formed from a single sheet of metal.

* * * * *

UNITED STATES PATENT AND TRADEMARK OFFICE
CERTIFICATE OF CORRECTION

PATENT NO. : 7,490,732 B2  
APPLICATION NO. : 11/389565  
DATED : February 17, 2009  
INVENTOR(S) : David M. Wasserman et al.

Page 1 of 1

It is certified that error appears in the above-identified patent and that said Letters Patent is hereby corrected as shown below:

Column 12, Claim 21, line 53; Replace "19" with --11--

Signed and Sealed this

Fourteenth Day of April, 2009

JOHN DOLL  
*Acting Director of the United States Patent and Trademark Office*